(12) United States Patent
Yamamuro et al.

(10) Patent No.: US 7,016,992 B2
(45) Date of Patent: Mar. 21, 2006

(54) ELECTRONIC MAIL SYSTEM

(75) Inventors: Keisei Yamamuro, Moriguchi (JP); Tatsuya Shimoji, Neyagawa (JP); Yuki Kusumi, Kashiba (JP); Yasushi Nishimura, Shijounawate (JP); Kazuo Okamura, Kawasaki (JP); Yasunori Tanaka, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 450 days.

(21) Appl. No.: 09/929,279

(22) Filed: Aug. 15, 2001

(65) Prior Publication Data

US 2002/0046310 A1    Apr. 18, 2002

(30) Foreign Application Priority Data

Aug. 17, 2000    (JP)    ............................. 2000-247326

(51) Int. Cl.
*G06F 3/00*     (2006.01)
*G06F 13/00*    (2006.01)
*H04L 9/00*     (2006.01)

(52) U.S. Cl. ..................... 710/100; 358/1.15; 358/402; 379/100.08

(58) Field of Classification Search ................ 710/100; 709/206, 203, 219, 200; 358/1.15, 402; 370/471; 379/100.08
See application file for complete search history.

(56) References Cited

U.S. PATENT DOCUMENTS

| | | | |
|---|---|---|---|
| 5,537,543 A * | 7/1996 | Itoh et al. ...................... 714/48 |
| 5,978,836 A * | 11/1999 | Ouchi ......................... 709/206 |
| 6,008,836 A | 12/1999 | Bruck et al. | |
| 6,134,582 A * | 10/2000 | Kennedy ..................... 709/206 |
| 6,411,393 B1 * | 6/2002 | Wakasugi ................... 358/1.15 |
| 6,442,589 B1 * | 8/2002 | Takahashi et al. ........... 709/203 |
| 6,618,748 B1 * | 9/2003 | Bates et al. ................. 709/206 |
| 6,687,742 B1 * | 2/2004 | Iwazaki ...................... 709/206 |
| 6,826,266 B1 * | 11/2004 | Toyoda et al. .......... 379/100.08 |
| 6,844,938 B1 * | 1/2005 | Toyoda et al. ............. 358/1.15 |

FOREIGN PATENT DOCUMENTS

| | | |
|---|---|---|
| EP | 1 022 915 A1 | 7/2000 |
| JP | 10-261251 | 9/1998 |
| JP | 2000-59867 | 2/2000 |
| WO | WO 97/31479 | 8/1997 |
| WO | WO 00/34851 | 6/2000 |
| WO | WO 00/40014 | 7/2000 |
| WO | WO 00/46986 | 8/2000 |

OTHER PUBLICATIONS

"Intelligent agents on the Internet and Web" by Murugesan, S. (abstract only).*
"A network environment for studying multimedia network architecture and control" by Lake, R. and Pate, L. (abstract only).*
European Search Report Dated Nov. 13, 2003.

* cited by examiner

*Primary Examiner*—Gopal C. Ray
(74) *Attorney, Agent, or Firm*—Nixon Peabody LLP; Donald R. Studebaker

(57) ABSTRACT

The present invention provides a system capable of individually controlling each of receiving devices while making full use of the advantages of broadcasting. Simultaneous transmission is carried out from a broadcasting device 2 to a plurality of receiving devices 6 via a broadcasting path. Further, the broadcasting device 2 sends operation control data to the receiving device 6 through a communication path. The receiving device 6 changes its operation in accordance with the operation control data when received broadcasting is decoded. In this way, each of the receiver devices 6 can be controlled individually using the operation control data while making full use of the advantages of broadcasting.

18 Claims, 25 Drawing Sheets

FIG.13

| service_id | event_id | OPENING TIME | PERIOD | NAME OF PROGRAM |
|---|---|---|---|---|
| 0003 | 1352 | 13:00 | 1:00 | |
| | 0004 | 21:00 | 0:30 | |

FIG.14

| | FUNCTIONS | OBJECTS TO BE CONTROLLED (PROGRAMS, PHONE NUMBER SO ON) | OPENING TIME | PERIOD |
|---|---|---|---|---|
| BLUE | record_reserve | 0001.0002.0003.0004 | 21:00 | 0:30 |
| RED | view_reserve | 0001.0002.0003.0004 | 21:00 | 0:30 |
| GREEN | | | | |
| YELLOW | | | | |

FIG. 17

| DATE | OPENING TIME | FINISH TIME | PROGRAMS |
|---|---|---|---|
| AUG, 15, 2001 | 21:00 | 21:30 | 0001. 0002. 0003. 0004 |

ELECTRONIC MAIL SYSTEM

CROSS REFERENCE TO RELATED APPLICATIONS

All the content disclosed in Japanese Patent Application No. 2000-247326 (filed on Aug. 17, 2001) including specification, claims, drawings and abstract and summary, is incorporated herein by reference in its entirety.

FIELD OF THE INVENTION

This invention relates to a technique for controlling a receiver(s) by a transmitter such as a broadcasting device via a communications path.

BACKGROUND OF THE INVENTION

A broadcasting system has an advantage that the system can provide a program simultaneously to a number of receivers at a low cost. On the other hand, the system has a disadvantage such that the operation of individual receivers can not easily be controlled from the transmitter side since the transmitter side carries out broadcasting that makes simultaneous transmissions.

Not only a broadcasting system, sometimes actions related with information being transmitted are required to an operator of the receiver when information is transmitted to the receiver from the transmitter. This might be a case that a broadcasting station transmits information regarding recommended programs to the receiver using an electronic mail. When the user who received such e-mail try to program one of the recommended programs for recording, the user need to perform the following steps: 1) see an electric program guide on a display, 2) search the program therefrom, and 3) carry out a series of procedures for reservation for recording (program recording). This requires complicated operation to the user.

Similarly, such complication also arises when some actions related with information being transmitted from a transmitter to a receiver are expected.

The object of the present invention is to overcome the above-mentioned problems and to provide a system capable of controlling the operations of individual receivers such as receiving broadcast in a broadcasting system.

Further object of the present invention is to provide a system capable of constructing a user interface optimized to operations when some actions related with information being transmitted from a transmitter are expected at a receiver side.

SUMMARY OF THE INVENTION (1) (5) (20) In accordance with characteristics of the present invention, there is provided an information communications system comprising a broadcasting device transmitting a broadcasting signal and a receiving device receiving the broadcasting signal from the broadcasting device via a broadcasting path, wherein the broadcasting device comprises: a broadcasting transmission part for transmitting the broadcasting signal simultaneous to a plurality of receiving devices via the broadcasting path; and a control data transmission part for transmitting operation control data controlling an operation mode of the receiving device through a communications path which is different from the broadcasting path; and wherein the receiving device each comprises: a broadcasting receiving part for receiving the broadcasting signal via the transmission path; a control data receiving part for receiving the operation control data from the control data transmission part through the communications path; and a control part performing a control process including a decoding process in which the broadcasting signal received by the broadcasting receiving part are decoded and the decoded signals are outputted to a user, the control part changing the control in accordance with the operation control data received by the control data receiving part. In this way, the receiver devices can be controlled individually while making full use of the advantages of broadcasting.

(6) In accordance with characteristics of the present invention, there is provided an information communications system in which the communications path includes one of a public telephone network and the Internet communications network. In this way, the receiver devices can easily be controlled individually.

(7) In accordance with characteristics of the present invention, there is provided an information communications system in which the operation control data is transmitted to the receiving device as an electronic mail. In this way, an operation mode of the receiving device can be controlled using an electronic mail.

(8) In accordance with characteristics of the present invention, there is provided an information communications system in which the operation control data is transmitted in a form of an electronic mail installing the operation control data in its header region. In this way, the operation control data can easily be separated from the body of an electronic mail.

(9) In accordance with characteristics of the present invention, there is provided an information communications system in which the broadcasting device notifies a specific receiving device via the broadcasting path that the broadcasting device has sent an electric-mail toward the specific receiving device through the communications path, and wherein the receiving device, after confirming the notification, establishes a communication link to obtain the electric-mail.

In this way, more efficient communications can be established without spending unnecessary expenses and without doing needless tasks.

(10) In accordance with characteristics of the present invention, there is provided an information communications system in which the receiving device changes the control assigned to each operation button in accordance with the received operation control data.

In this way, control can be optimized by the control of the transmission side.

(11) In accordance with characteristics of the present invention, there is provided an information communications system in which the operation control data includes a description for making a reservation for recording a program to be transmitted via the broadcasting path and another description for assigning a function of making a reservation for recording the program to which of the operation button, and wherein the receiving device assigns the function of making a reservation for recording the program to one of the operation buttons in accordance with the description of the operation control data. In this way, the user can make a reservation for recording a program easily.

(12) In accordance with characteristics of the present invention, there is provided an information communications system in which the operation control data is sent from the broadcasting device to the receiving device in a form of an electronic mail, and wherein the receiving device displays a recommended program in accordance with a description of informing a recommended program included in the electronic mail and displays that the function of making a reservation for recording is assigned to which one of the operation buttons in accordance with the operation control data. In this way, the user can easily recognize function of each of the operation buttons.

(13) In accordance with characteristics of the present invention, there is provided an information communications system in which the receiving device performs a control process in which a determination is made whether viewing of a predetermined broadcasting program is allowed or not in accordance with the received operation control data.

In this way, allowance for viewing a predetermined broadcasting program can be provided to individual receiving device by the control of the transmission side.

(14) In accordance with characteristics of the present invention, there is provided an information communications system in which a user of the receiving device sends a request of permission for viewing the broadcasting program to the broadcasting device through the communications line by operating the receiving device, and wherein the broadcasting device sends operation control data for allowing view of the broadcasting program to a receiving device upon receipt of the request in accordance with predetermined criteria.

In this way, the transmission device receives requests from the receiving devices and can provide the allowance only to part of the receiving devices, which satisfy predetermined criteria.

(15) In accordance with characteristics of the present invention, there is provided an information communications system in which the broadcasting program is a quiz program, wherein a user sends an answer of a quiz to the broadcasting device through the communications path by operating the receiving device, and wherein the broadcasting device sends operation control data for allowing view of the quiz program only to a predetermined receiving device based on a judgement in which a determination is carried out whether the received answer is correct or not.

In this way, allowance for viewing a predetermined broadcasting program can be provided depending upon the answer of the quiz.

(16) In accordance with characteristics of the present invention, there is provided an information communications system in which the operation control data includes one of a program and data, necessary for outputting content of a program in accordance with the broadcasting signal transmitted via the broadcasting path, and wherein the receiving device outputs the content of the program using one of the program and the data.

In this way, the program and/or data necessary for viewing broadcasting can be provided only to a predetermined receiving device(s).

(21)(27)(30) In accordance with characteristics of the present invention, there is provided an electronic mail system in which the transmission device transmits operation control data, for controlling a user interface of the receiving device when a control related with a body of the electronic mail is performed at the receiving device, together with the body of the electronic mail so as to be included in the body, and wherein the receiving device outputs the body of the received electronic mail to the user and constructs a user interface for performing a control related with the body of the electronic mail in accordance with the received operation control data.

In this way, an optimum user interface suitable for the transmitted information can be constructed dynamically at the receiving device according to the intent of the transmission side.

(28) In accordance with characteristics of the present invention, there is provided an electronic mail system in which the operation control data includes data for setting function of an operation button of the receiving device. In this way, function of the operation buttons can be assigned to most suitable ones for content of the information.

The term "broadcasting path" in this invention refers to any communication path(s) for performing simultaneous transmission, for example a wireless communication path(s) and a wire communication path(s).

The term "communications path different from the broadcasting path" refers to not only a communications path which is not physically identical with the broadcasting path even if the path is physically identical with the broadcasting path, that includes a communications path independent from the broadcasting path from a certain point of view, for example, frequency, timing. Practically, such communications path includes not only a wire communications path such as a public telephone network, the Internet communications network both opposing a concept of a wireless communications path used as the broadcasting path, but also includes a wireless communication path using different frequencies and a wireless communication path capable of being separated by timing.

The term "receiving device" refers to a device carrying out at least a process of receiving a broadcasting signal and extracting data on a desired program. This includes not only a set-top box, but also a television-set which equips function of a set-top box.

The term "storage medium storing a program" refers to a ROM, a RAM, a flexible disk, a CD-ROM, a memory card, a hard disk, for example, on which a program(s) is recorded. The concept of this term also includes communication media such as telephone lines and transmission routes. The concept also includes not only recording media such as a hard disk with which a program recorded thereon is directly executed but also recording media such as a CD-ROM recording a program to be once installed on a hard disk or the like and then executed.

The term "program" as used herein refers not only to a program that can be directly executed with a CPU, but also to a program of a source format, compression-processed program, coded program, etc.

The features, other objects, applications, and advantages of the present invention will become clear in reference to the following embodiments and drawings.

BRIEF DESCRIPTION OF DRAWINGS

FIG. 13 is a view showing program on-air schedule data S_EIT;

FIG. 14 is a view showing data for controlling operation mode stored in a memory 80;

FIG. 17 is a table into which data for making a reservation for recording is filled;

DETAILED DESCRIPTION OF THE PREFERRED EMBODIMENTS

1. Concept of the Present Invention (When the Present Invention is Applied to a Broadcasting System)

Figure 1:
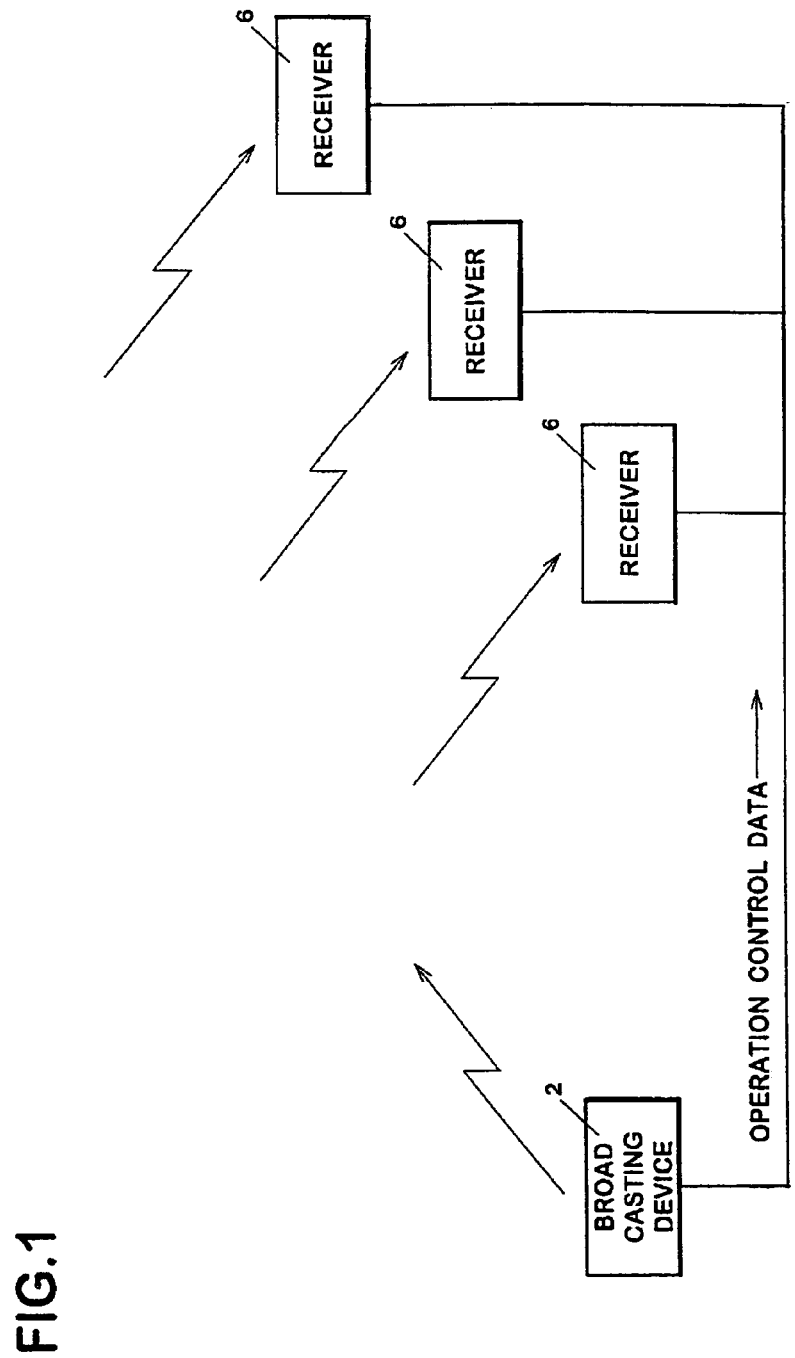
FIG. 1 is a conceptual diagram illustrating a broadcasting system using the present invention.

FIG. 1 a conceptual diagram of an information communications system according to an embodiment the present invention. Simultaneous transmission (broadcasting) is carried out from a broadcasting device 2 to a plurality of receiving devices 6 via a broadcasting path. Further, the broadcasting device 2 sends operation control data to part of the receiving device 6 through a communication path. The receiving device 6 changes its operation in accordance with the operation control data when received broadcasting is decoded. In this way, each of the receiver devices 6 can be controlled individually using the operation control data while making full use of the advantages of broadcasting.

1. The First Embodiment (1) Overall Structure

Figure 2:
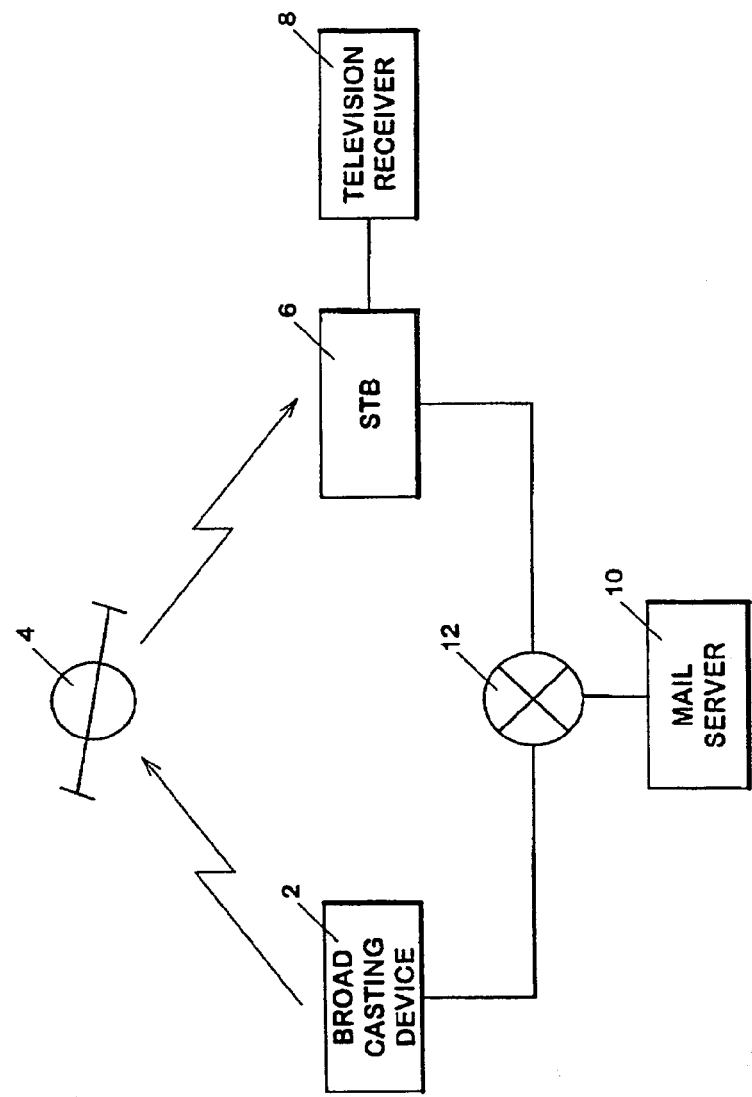
FIG. 2 is an overall view of a first embodiment of the present invention.

FIG. 2 shows an overall view of an embodiment of the present invention applied to a satellite broadcasting system. Broadcasting device 2 broadcasts broadcasting signals to a set-top box (hereinafter referred to STB) which forms a receiving device via a communications satellite 4. The STB 6 decodes the received broadcasting signals and provide the decoded signals to a television receiver 8. The television receiver 8 outputs the contents of the broadcasting as images and sounds.

In the means time, the broadcasting device 2 and STB 6 are connected to the Internet 12. The broadcasting device 2 transmits an electronic mail for the STB 6 to a mail-server 10. Operation control data is stored in he header portion of the electronic mail. The STB 6 accesses the mail-server 10 to obtain the electronic mail. Then the STB 6 determines its operation such as reception of broadcasting, decode of received signals in accordance with the operation control data is stored in he header portion. In this embodiment, the functions assigned to each of operation buttons provided to STB 6 and/or the television receiver 8 are changed in accordance with the operation control data.

(2) Structure and Operation of the Broadcasting Device

Figure 3:
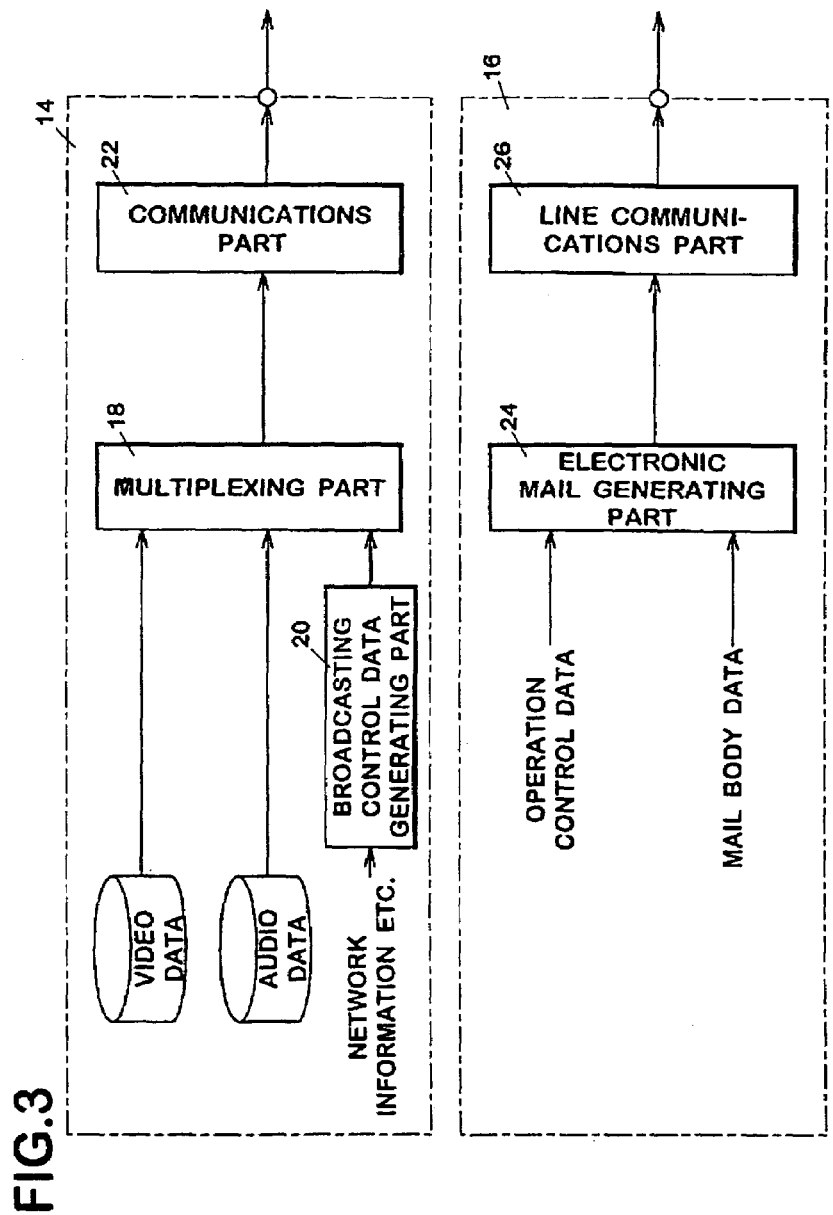
FIG. 3 is a block diagram of the broadcasting device.

FIG. 3 is a block diagram of the broadcasting device 2. The broadcasting device 2 comprises a broadcasting transmission part 14 and a control data transmission part 16.

① Broadcasting Transmission Part

Video data and audio data for a plurality of channels (services) are provided to a multiplexing part 18 of the broadcasting transmission part 14. The multiplexing part 18 compresses these data and makes these data in packets. Further, the multiplexing part 18 generates broadcasting control data (for example, PAT, PMT) in order to identify a plurality of services. A broadcasting control data generating part 20 generates broadcasting control data after receipt of network information and the like, for example, a scheduled on-air time. The multiplexing part 18 outputs these data to a communications part 22 as transport streams. The communications part 22 modulates the transport streams thus generated and sends the modulated streams to a broadcasting satellite 4.

② Configuration of Broadcasting Signals

Figure 4:
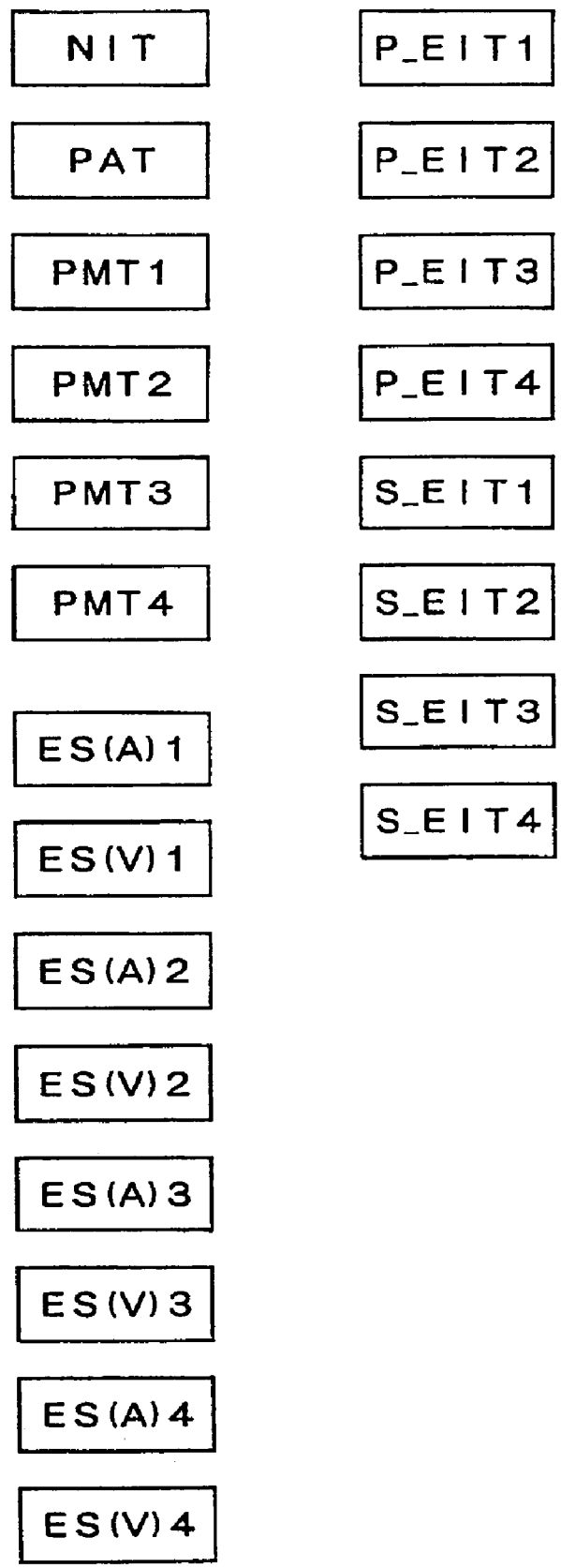
FIG. 4 is an exemplary view showing packetized broadcasting signals.

FIG. 4 is an exemplary view showing the data structure of a transport stream to be broadcasted in a packetized form. In this drawing, a transport stream, in which a total of four (4) services SV1, SV2, SV3 and SV4 are multiplexed, is illustrated. In the drawing, a packet ES(V) shows packetized video data for a service SV1 and packet ES(A) represents packetized audio data for the service SV1. Similarly, packets ES (V) 2, ES(A) 2, packets ES (V) 3, ES(A) 3 and packets ES (V) 4, ES(A) 4 represent packetized video data and packetized audio data for the services SV2, SV3 and SV4 respectively.

In addition, broadcast control data NIT, PAT, PMT1, PMT2, PMT3 and PMT4 used for packet multiplexing are also multiplexed. With the broadcast control data, audio/video data of the services SV1, SV2, SV3 and SV4 thus multiplexed can be separated from one another.

Another broadcasting control data P_EIT1, P_EIT2, P_EIT3 and P_EIT4 so on each describing information on a program for the program currently under broadcast and another broadcasting control data S_EIT1, S_EIT2, S_EIT3 and S_EIT4 so on each describing information on a program for the program to be broadcasted, are multiplexed. Further more broadcasting control data not shown in the drawing are multiplexed. The data shown in FIG. 4 is packetized in a form of data with packet IDs.

Just one transport stream is illustrated in FIG. 4, a plurality of transport streams multiplexed similar to the shown one are multiplexed for broadcasting.

Transmission specifications such as its frequency, plane of polarization and other factors as to all the transport streams and a list of services multiplexed into the transport streams are described in broadcasting control data NIT. In this way, it is possible to identify that a specific service is multiplexed on which one of transport streams having different frequency.

Packet IDs of broadcasting control data PMT1, PMT2, PMT3 and PMT4 each corresponding to the services SV1, SV2, SV3 and SV4 respectively are described in broadcasting control data PAT. In addition, packet Ids of video data ES (V)1 and audio data ES (A) 1 are described in the broadcasting control data PMT1. Similarly, packet Ids of video and audio data as to the services SV1, SV2, SV3 and SV4 are described in the broadcasting control data PMT2, PMT3 and PMT4.

Consequently, it is possible to separate video and audio data of a desired service from the transport streams according to the description of the broadcasting control data NIT, PAT and PMT.

③ Control Data Transmission Part

Referring back to FIG. 3, an electronic mail generating part 24 generates an electronic mail generates an electronic mail after receipt of the body data of the electronic mail and operation control data. At that time, the operation control data is stored in the herder part of the electronic mail, This electronic mail is transmitted to a mail-server 10 by a line communications part 26 in order to be stored in a mailbox of a destination of the mail. Typically, the operation control data is inputted by the user, the data may also be generated from a program on-air schedule included in network information.

④ Configuration of Electronic Mail

Figure 5:
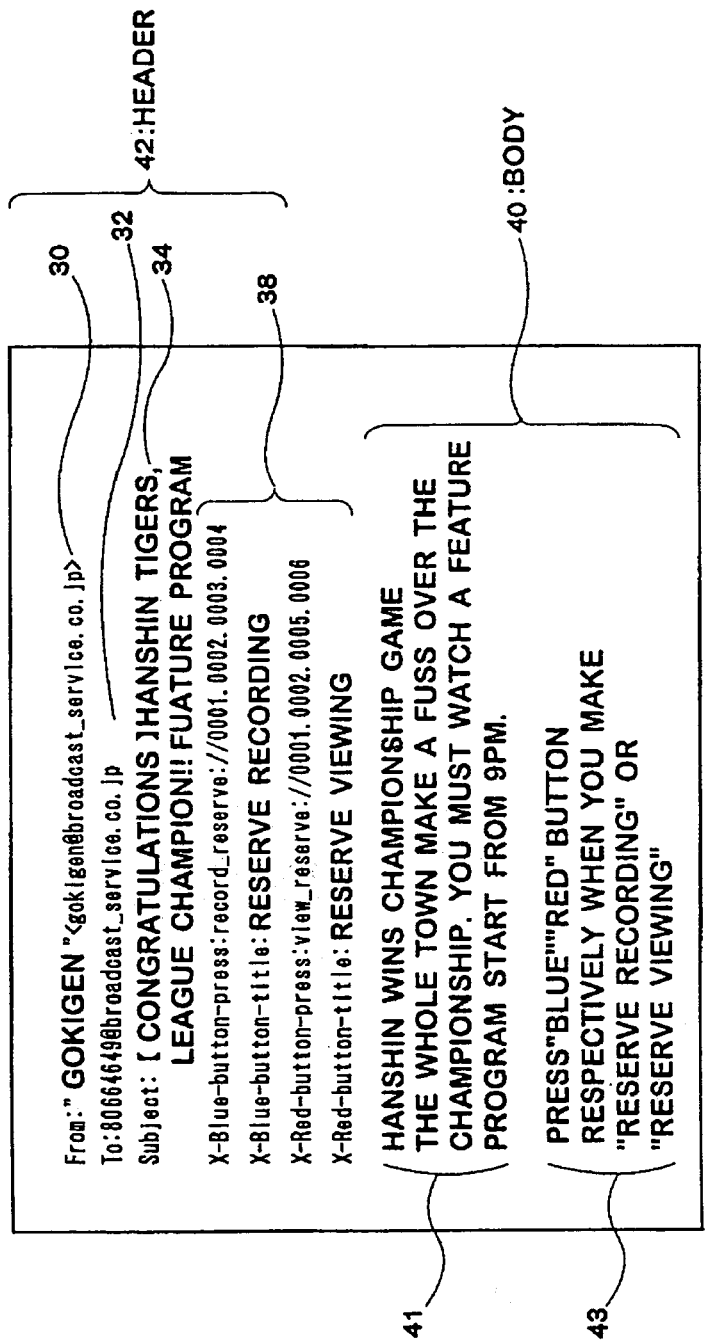
FIG. 5 is an example of an electronic mail.

FIG. 5 shows an example of an electronic mail generated by the electronic mail generating part. The electronic mail comprises a header part 42 describing its destination and related information and a body 40. In this embodiment, operation control data is stored in the header part, the control data may also be stored in the body.

The technical standard of text messages is defined in RFC0822 (standard for the format of APRA Internet text messages), description in this embodiment follows the RFC0822 standard.

Information on originating party 30, information on a destination party 32 information on subject 34, operation control data 38 are stored in the header part 42.

The originating party information 30 of an electronic mail is information, which indicates an originating party who transmits the electronic mail. In an example shown in FIG. 5, it shows that a party named "gokigenTV" who has an e-mail address of gokigen@broadcast service.co.jp transmits an electronic mail.

The destination party information 32 is information which indicates the destination of the electronic mail. The example shown in FIG. 5, it shows that the electronic mail is sent to an e-mail address of 80664649@broadcast service.co.jp.

The e-mail address of 80664649@broadcast service.co.jp is a description that indicates a destination of an electronic mail. The number 80664649 is a registration number uniquely assigned to each viewer (or each receiver) and from the registration number a receiver 6 to which an electronic mail is send can be identified. The information following @ (@broadcast service.co.jp) is an example of description for identifying broadcast station, and information of jp, co, and broadcast service respectively indicates that Japan, company and name of the company (tentative name).

The portion 80664649 may be registered in a desired name (practically, only numerals and alphabets are allowed) of a viewer at when an electronic mail is generated. But a registration number must be assigned uniquely. The registration number is a number assigned to each viewer who makes registration when the viewer purchases a receiver, for example. Unique number is assigned to every viewer (receiver).

Subject information 34 of E-mail shows title of the E-mail.

The operation control data 38 is data for controlling operations of the STB 6. In this example, this data is data for defining assignment of functions to buttons on a remote controller of the STB 6. According to the description in FIG. 5, a function of making a reservation for recording a predetermined program is assigned to a blue-button. Similarly, a function of making a reservation for viewing a predetermined program is assigned to a red-button. A series of processes by which functions are assigned to the buttons on the remote controller in the STB 6 as a result of interpreting the operation control data will be described later.

⑤ Generating an Electronic Mail

Figure 6:
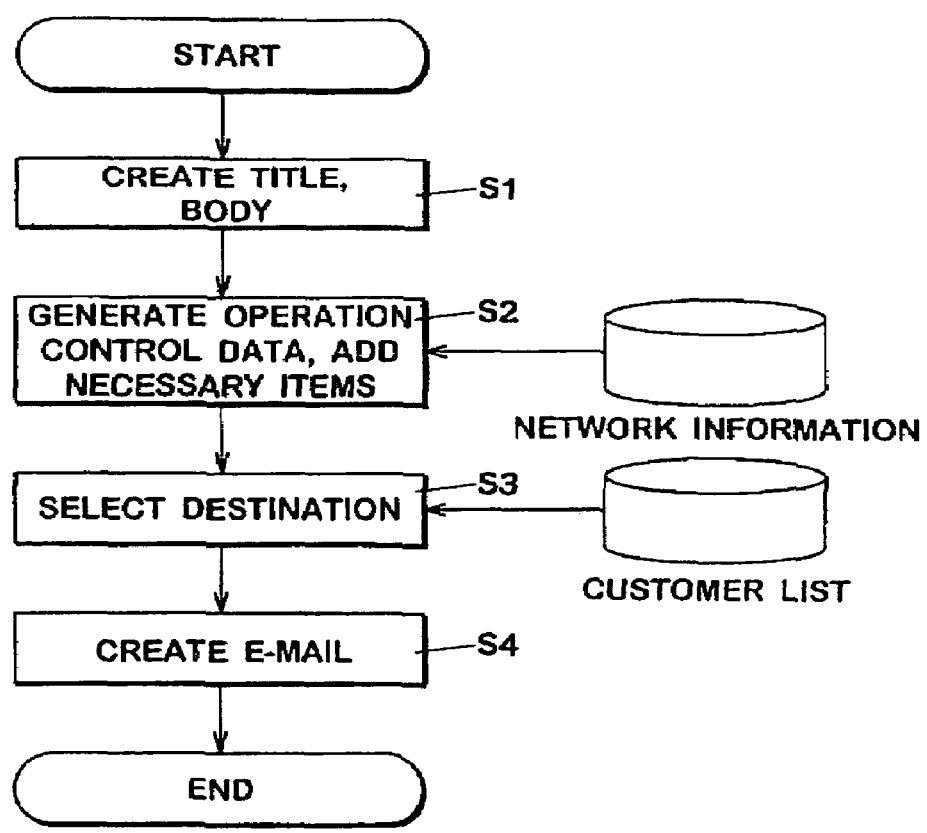
FIG. 6 is a flowchart showing how to create an electronic mail.

In this embodiment, a computer and a program for generating an electronic mail realize the electronic mail generating part 24. FIG. 6 shows a flowchart showing how to create an electronic mail.

At step S1 shown in FIG. 6, the mail generating part 24 enters a content 41 of the body. This could be data entered by a user with a keyboard, for example and data stored in a flexible disk, for example, may be entered. The content 41 describes that a feature program will be aired from 9 PM.

Figure 7:
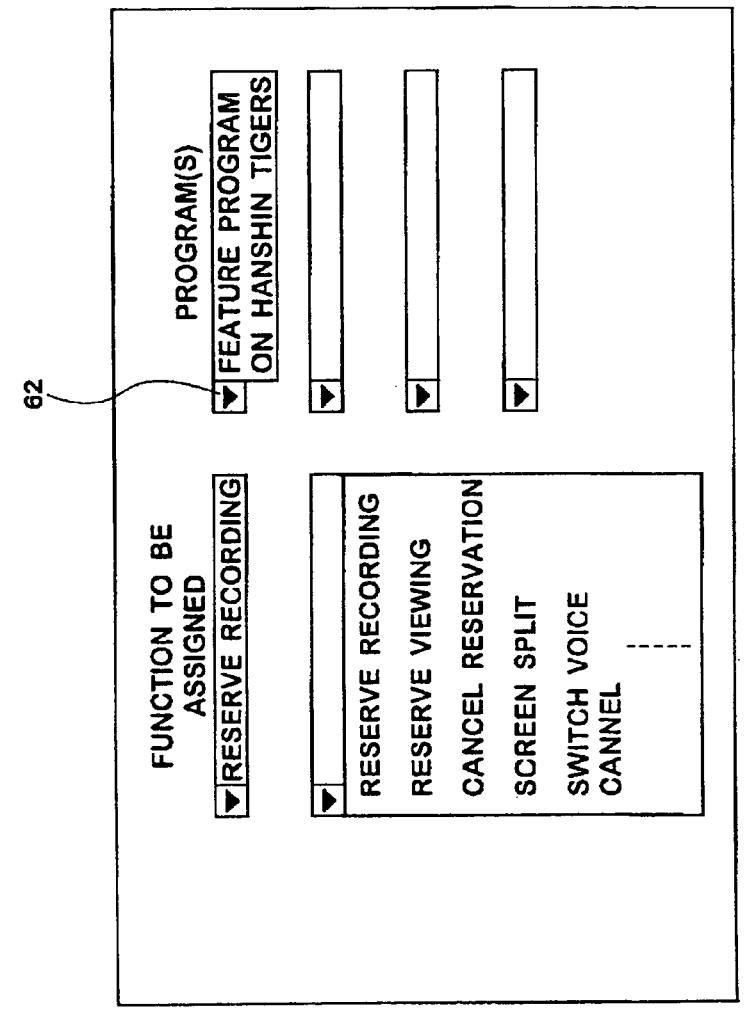
FIG. 7 is a view showing an image displayed when an electronic mail is created.

Then, operation control data corresponding to the content is generated (step S2 of FIG. 6). At that time, the mail-generating program displays images illustrated in FIG. 7 in order for a user to input the necessary items. On the images, the necessary items shows the requirements for which of the functions to be assigned to which buttons on the remote controller of the receiving device. As illustrated, a set-up is made that a function of making a reservation for recording a predetermined program is assigned to the blue-button. As to assignment of a function to the red-button, the user chooses one item aid from a pull-down menu displayed in the images. Similarly, the mail generating program lineups a list of programs that can choose from according to the network information when a selection button 62 is clicked. The user chooses a desired program from the list. In this example, the feature program described in the above is chose.

Upon choosing a program, the mail-generating program generates operation control data 38 shown in FIG. 5.

The operation control data thus generated take on the meaning as follows. In a description "X-Blue-button-press: record_reserve//0001. 0002.0003.0004", the description X-Blue-button-press shows that the operation performed as the blue-button is depressed is defined in upcoming information. Also, the description record_reserve means shows the operation is making a reservation for recording a predetermined program. The description is defined in accordance with the selection by which a reservation for recording a predetermined program is assigned to the blue-button made by the user on the image shown in FIG. 7.

Further the description 0001. 0002. 0003. 0004 is a description for specifying programs to be chosen. The headmost one, 0001 is information for specifying a broadcasting station (original network id). The second one, 0002 is information for specifying a transport stream out of plural transport streams (transport stream id). The third one, 0003 is information for specifying a service (service id), and the fourth one, 0004 is information for specifying a program (event id). In this example, a feature program, which start from 9 PM is specified by the description 0001. 0002. 0003. 0004. In other words, a reservation for recording the feature program starting from 9 PM is carried out by depressing the blue-button at the receiving device. The mail generating program extracts information on the feature program in accordance with the fact that the user assigns a feature program entitled "Hanshin Tigers special" to the blue-button on the image shown in FIG. 7.

The description "X-Blue-button-title: recording reservation" in FIG. 5 means that characters "recording reservation" is displayed on a region showing the function assigned to the blue-button at the receiving device The description "X-Red-button-press-view_reserve:0001. 0002. 0003. 0004" means that a reservation for viewing the feature program is carried out by depressing the red-button.

The description "X-Red-button-title: viewing reservation" in FIG. 5 means that characters "viewing reservation" is displayed on a region showing the function assigned to the red-button at the receiving device.

Further, the mail-generating program generates a description 43 which indicate which function is assigned to which button, and adds the description to the end of the body.

The destination of an electronic mail is selected (step S3 of FIG. 6). In this step, a customer to whom an electric mail is sent is selected according to a customer list. Then e-mail address of the customer is extracted from the list. For example, if the operator enters a keyword "watching baseball" for the selection by using a column of personal interest in the customer list, the mail generating program selects a customer who has personal interest in watching baseball and extracts his/her e-mail address. It is preferable to select an e-mail address of a customer who has an attribution related with the description in a content 41 of the body 40.

Finally, the mail-generating program generates an electronic mail to the selected customer in accordance with the information described above.

Although, the functions of recording reservation and viewing reservation are assigned to the blue-button and the red-button respectively in the above description, the user can assign desired functions (canceling reservation, purchase order, for example) to any of buttons respectively.

(3) Structure and Operation of the Receiving Device

① Block Diagram of the Receiving Device

Figure 8:
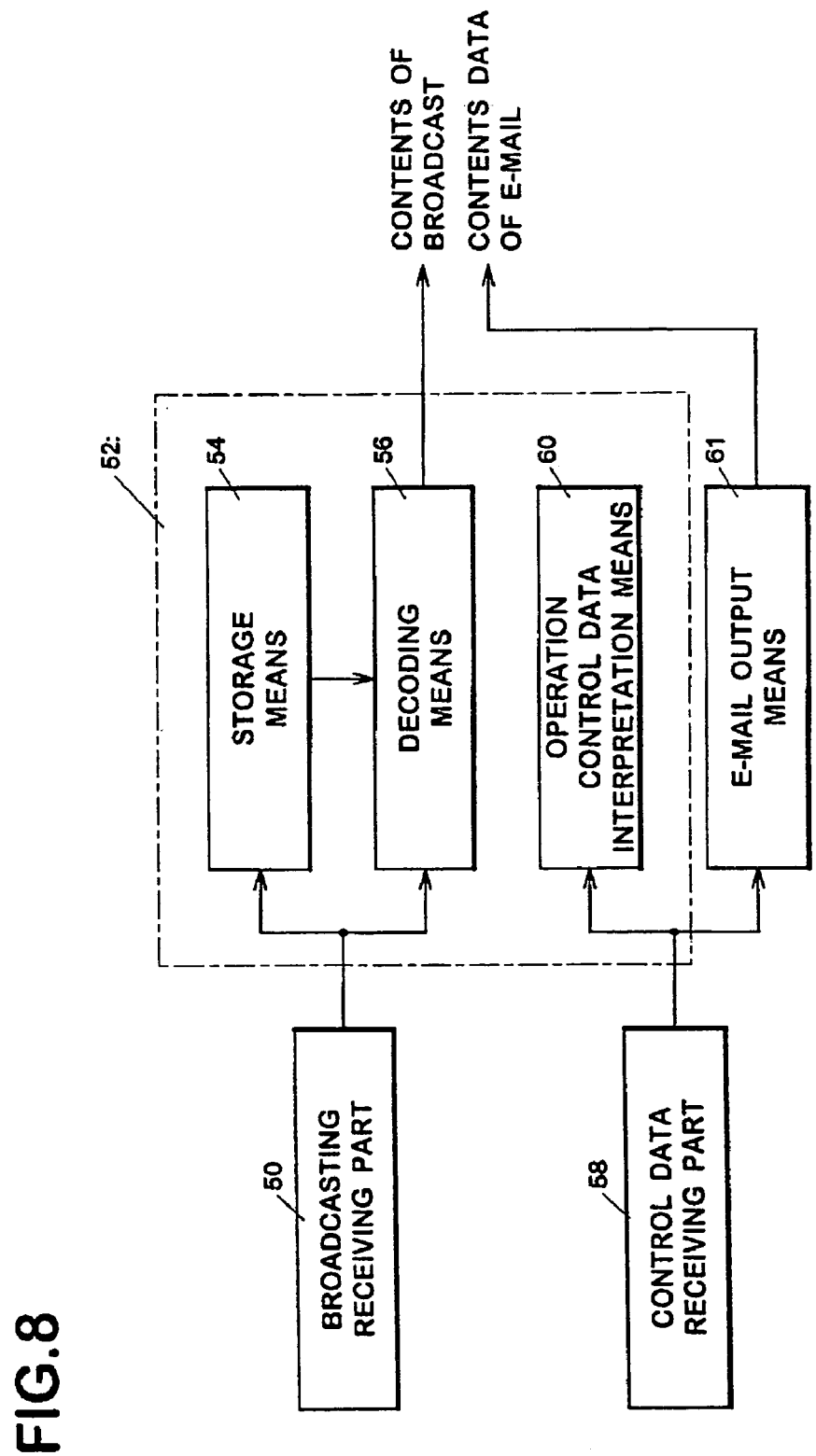
FIG. 8 is a block diagram of a receiving device.

FIG. 8 shows a block diagram of the receiving device. A broadcasting receiving part 50 receives broadcasting signals from the broadcasting device. A decoding means 56 of a control part 52 decodes the received broadcasting signals to obtain its contents and outputs the decoded signals. Also, storage means of the control part 52 stores the decoded broadcasting signals therein.

A control data receiving means 58 receives electronic mail addressed itself stored in the mail-server 10. An e-mail output means 61 outputs the body of the received electronic mail for display. An operation control data interpreting means 60 interprets operation control data included in the header region and controls operation of the control part 52.

② Hardware Structure of the Receiving Device

Figure 9:
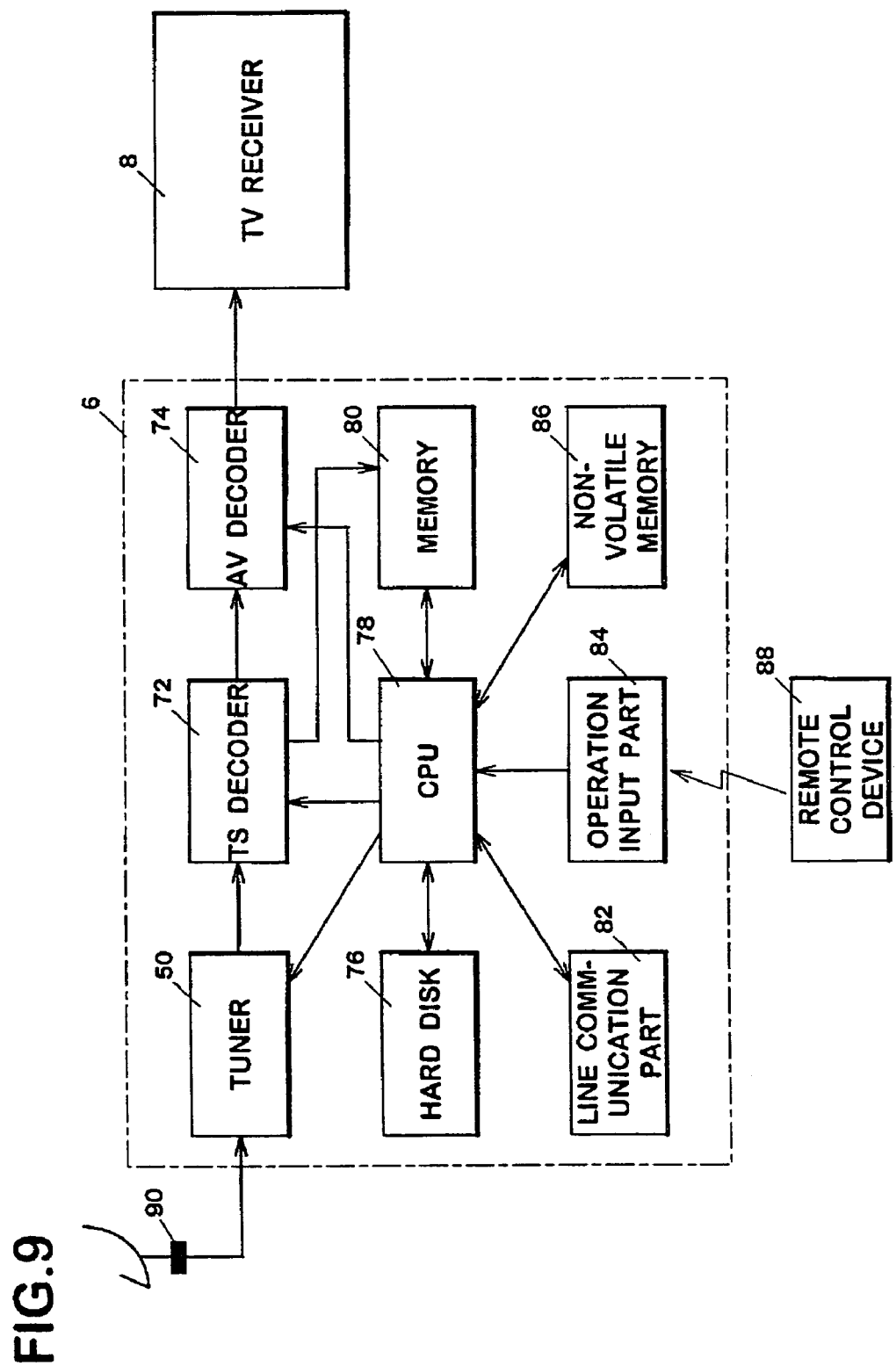
FIG. 9 is a diagram showing the hardware structure of the receiving device.

FIG. 9 shows a hardware structure of the receiving device shown in FIG. 8 realized by using a CPU. The receiving device 6 comprises a tuner 50 forming the broadcasting receiving part, a TS decoder 73, an AV decoder 74, a hard disk 76, a CPU 78, a memory 80, a line communication part 82, an operation inputting part 84, a non-volatile memory 86 and a remote controller 88.

Within the non-volatile memory 86, an electronic mail processing program for performing processing to an electronic mail is stored in addition to a broadcasting processing program for performing processing, for example, reception/ recording of broadcasting signals.

Figure 10:
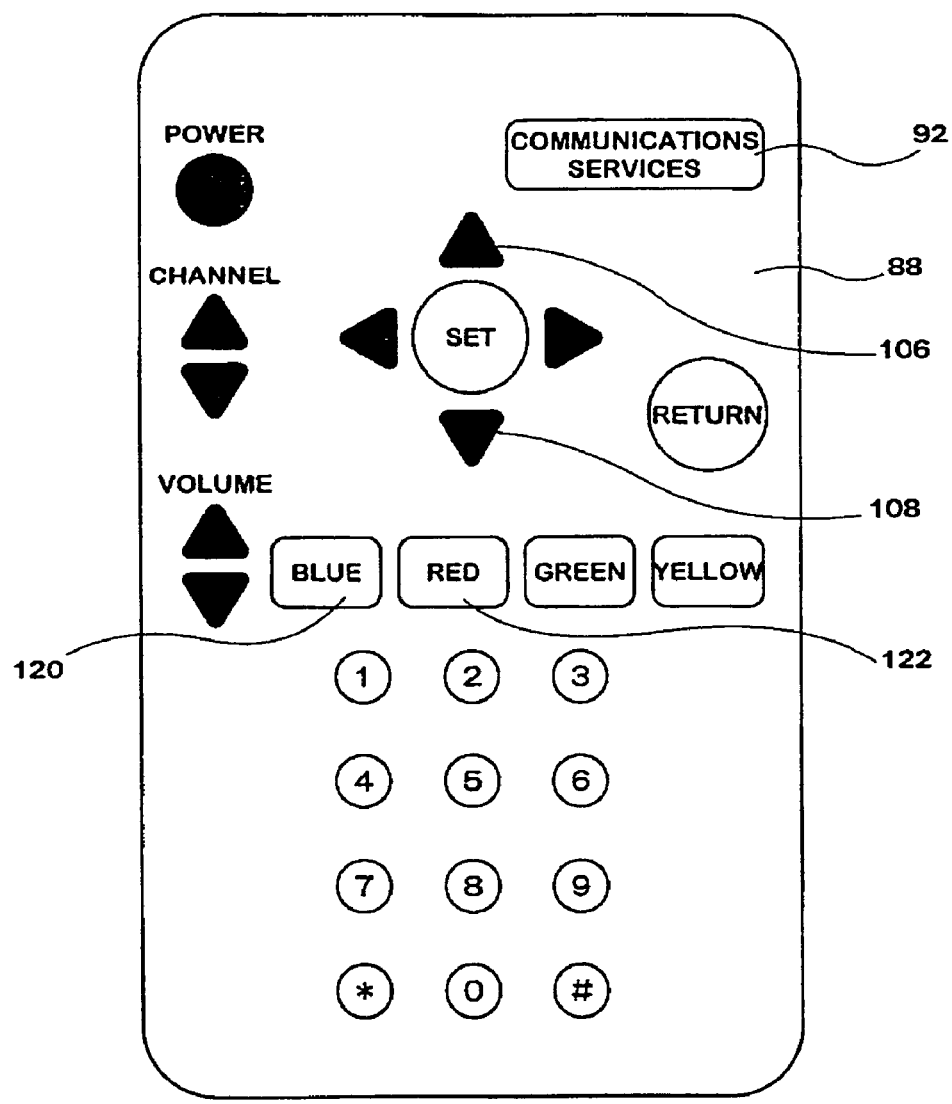
FIG. 10 is a view showing an appearance of a remote controller.

The remote controller 88 is looks like the one shown in FIG. 10 and is used for the user to provide commands to the receiving device 6. Signals from the remote controller 88 are received at the operation-input part and outputted to the CPU 78. Commands from the user may also be provided to the receiving device with buttons provided on the operation inputting part 84.

Each of the tuner 50 and TS decoder 72 can handle two or more signals/data simultaneously. In this way, the receiving device can receive a specific program while recording another program.

③ Processing of Received Broadcasting Signals

Broadcasting signals catched by an antenna are provided to the tuner 50, which forms the broadcasting receiving part. The tuner 50 selects a desired transport stream and provides the selected stream to the TS decoder under the control of the CPU 78.

The TS decoder 72 selects packets of video and audio data belong to a desired service out of the selected stream and outputs the packets as digital data under the control of the CPU 78. At that time, the CPU 78 controls the TS decoder 72 so that the video and audio data as to the desired service are separated other data by using the broadcasting control data shown in FIG. 4.

The output of the TS decoder 72 is provided to the AV decoder 74. The AV decoder 74 converts the digital data into composite signal for television (for example, NTSC signals, PAL signals) and outputs them. The TV receiver 8 receives the composite signals and outputs video images and sounds therefrom.

Detailed description of the above processing is disclosed in Japanese patent application number Hei 11-363708 (entitled record/playback device for digital broadcasting and method thereof) incorporated herein by reference by their entirety.

④ Processing of Received Electronic Mail

Subsequently, processing performed at the receiving device when the user commands the receipt of an electronic mail will be described. The CPU 78 performs processing for receiving an electronic mail after the user depresses a communications service button 92 on the remote controller.

Figure 11:
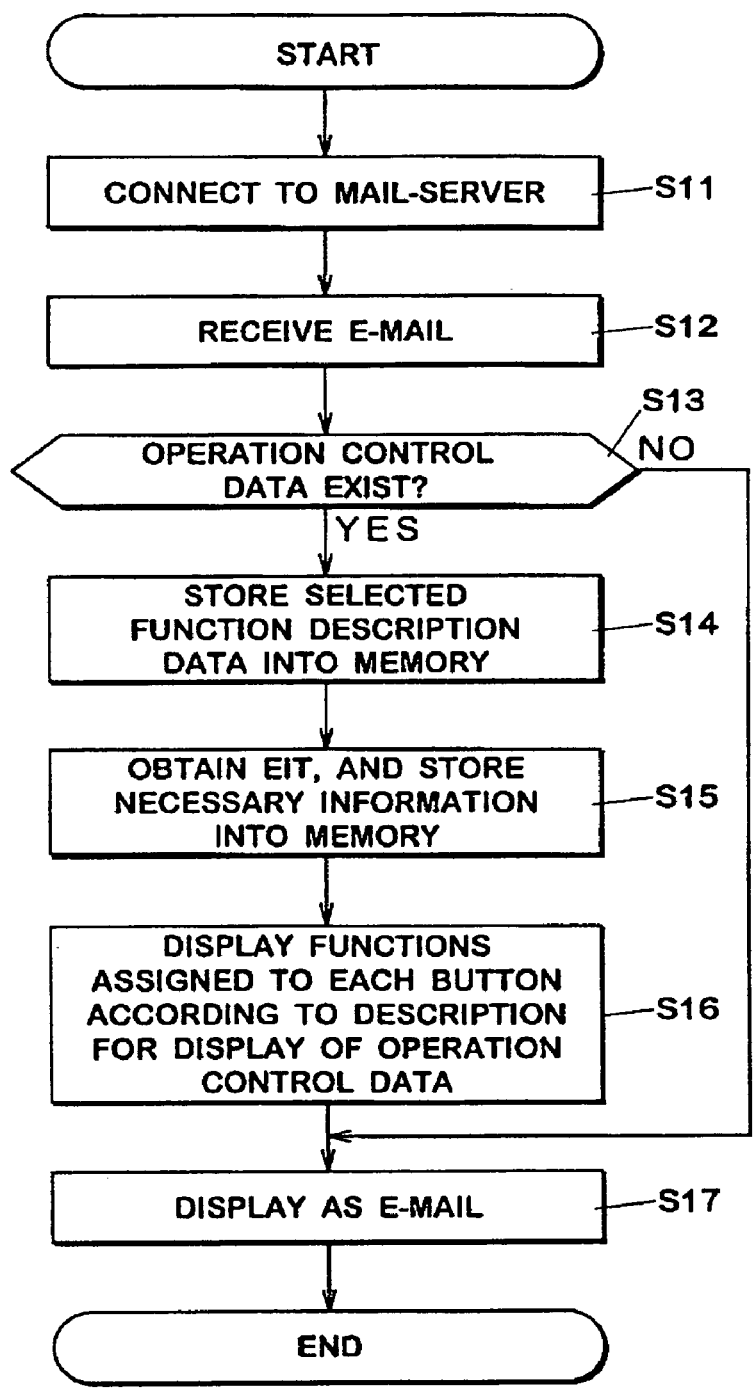
FIG. 11 is a flowchart showing the processing performed for a received electronic mail.

FIG. 11 shows a flowchart of a received electronic mail processing program. At step S11 shown in FIG. 11, the CPU 78 controls the line communications part 82 so that the communications part connects to the mail-server 10. Then the CPU 78 determined whether any of the electronic mails stored in the mail-server 10 is addressed itself or not. If so, the CPU 78 controls other parts to receive an electronic mail addressed its-self (step S12 of FIG. 11). The non-volatile memory stores own e-mail address.

Subsequently, a determination whether operation control data is included in the received electronic mail or not is made (step S13 of FIG. 11). In this embodiment, it is defined that the operation control data starts with characters of X- (see FIG. 5). If none of the operation control data is included therein, the electronic mail is treated and displayed as an ordinary electronic mail (step S17 of FIG. 11).

When the operation control data is included, the process proceeds to step S14 shown in FIG. 11. At step S14, function description data is selected from the operation control data, and the selected function description data is stored in the memory 80. The function description data is a description, which defines operations of the receiving device when a command is entered with the button. In FIG. 5, the description "X-Blue-button-press:record_reserve/ 0001.0002.0003.0004" and description "X-Red-button-press:view_reserve:0001. 0002. 0003. 0004" are the function description data.

Further, the CPU 78 retrieves information on the program described in the function description data, for example, an opening time, a period of the program and so on, from the program on-air schedule data S_EIT (see FIG. 4) for just in case any buttons depressed. Then the retrieved information is stored into the memory 80 together with the function description data. Detailed process of this process is disclosed below.

The CPU 78 obtains information on programs "0001. 0002. 0003. 0004" from the function description data. The program information provides a broadcasting station (original network id), transport streams (transport stream id), a service (service id) and a program (event id). The CPU 78 controls the tuner 50 in accordance with the broadcasting station ID and receives the broadcasting signals transmitted by the station. Then, the transport stream ID "0002" is set for the TS decoder 72. The content of the transport stream is obtained. Further, program on-air schedule data S_EIT as to a service is retrieved from the transport stream in accordance with the service ID "0003".

As previously described, both the tuner 50 and the TS decoder 72 can handle two or more signals/data simultaneously, no influence on reception/display of the broadcasting currently receiving is observed even when the above operation is underway.

FIG. 13 shows program on-air schedule data S_EIT of the service "0003". Information on a program to be aired within the service "0003" is described in the program on-air schedule data S_EIT.

The CPU 78 obtains data on a desired program from the program on-air schedule data S_EIT according to the program ID "0004". In this case, information on the program such as opening time of it as 9 PM and the duration as 30 minutes can be obtained.

As shown in FIG. 14, the CPU 78 stores the opening time and the duration of the program into the memory 80 together with the operation control data.

Subsequently, The CPU 78 extracts a description for display from the operation control data. The description for display is a description used for displaying functions assigned to each of the buttons. The descriptions "X-Blue-button-title: recording reservation" and description "X-Red-button-title: viewing reservation" shown in FIG. 5 correspond such description. The CPU 78 output data for displaying the functions assigned to each button on regions 94 prepared therefor shown in FIG. 5 to the AV decoder 74 in accordance with the description for display. As a consequence, characters "recording reservation" is displayed on a region 96 displayed in blue on the display screen, and characters "viewing reservation" is displayed on a region 98 displayed in red on the display screen. In this way, the user is able to recognize the functions assigned to each button easily.

Figure 15:
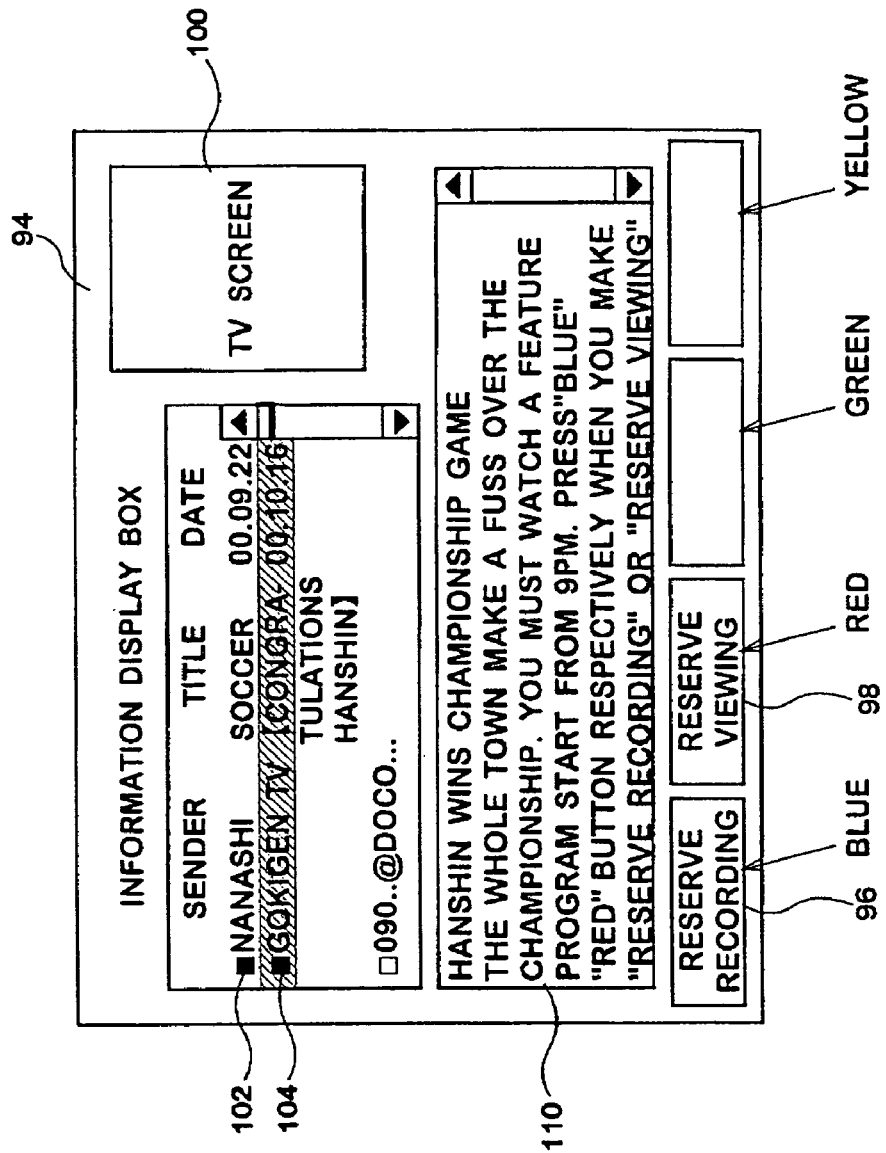
FIG. 15 is an image of an electronic mail actually received.

Subsequently, the CPU 78 controls to display the title/the body of an electronic mail on the screen (step S17 of FIG. 11). FIG. 15 shows an exemplary example of the image thereof. In this embodiment, an image 100 of broadcasting currently received is displayed together with an image for displaying electronic mail. Therefore, a list of electronic mails received at the receiving device is also displayed on the screen.

The receiving device is designed so that display of electronic mails, which have already opened turn their color into black from white at a display region 102 for displaying received mail list. Also, the user can switch which of the electronic mails is designated by depressing up-down buttons 106 and 108 shown in FIG. 10. An electronic mail informing a feature program is selected in FIG. 15. Steps following the step S13 in FIG. 11 are performed every time the selection of electronic mails is switched.

Figure 16A:
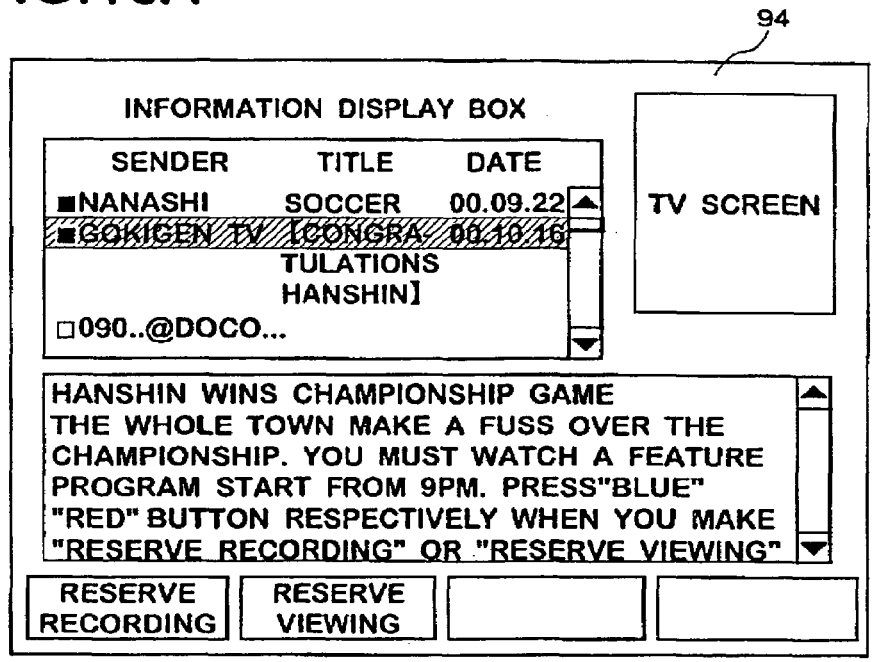
FIGS. 16A and 16B are images of another electronic mail actually received.
Figure 16B:
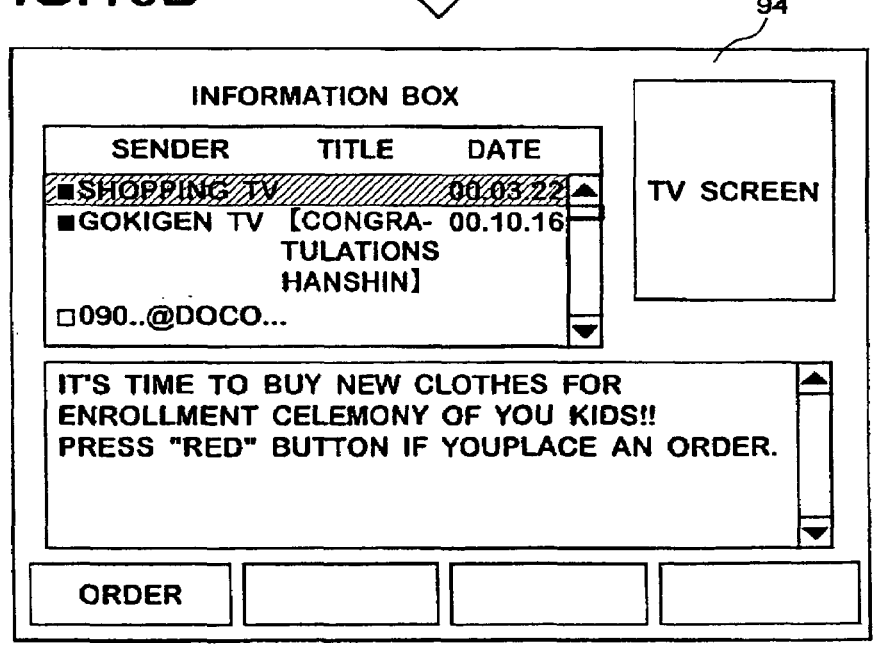

For example, when an electronic mail as to a shipping channel is selected, a display on the screen also turns from FIG. 16A to FIG. 16B. This automatically changes the description of the region 94 indicating functions of the buttons according to the operation control data described in the selected electronic mail. In the display shown in FIG. 16B, a function of placing an order is assigned to the blue-button.

Figure 12:
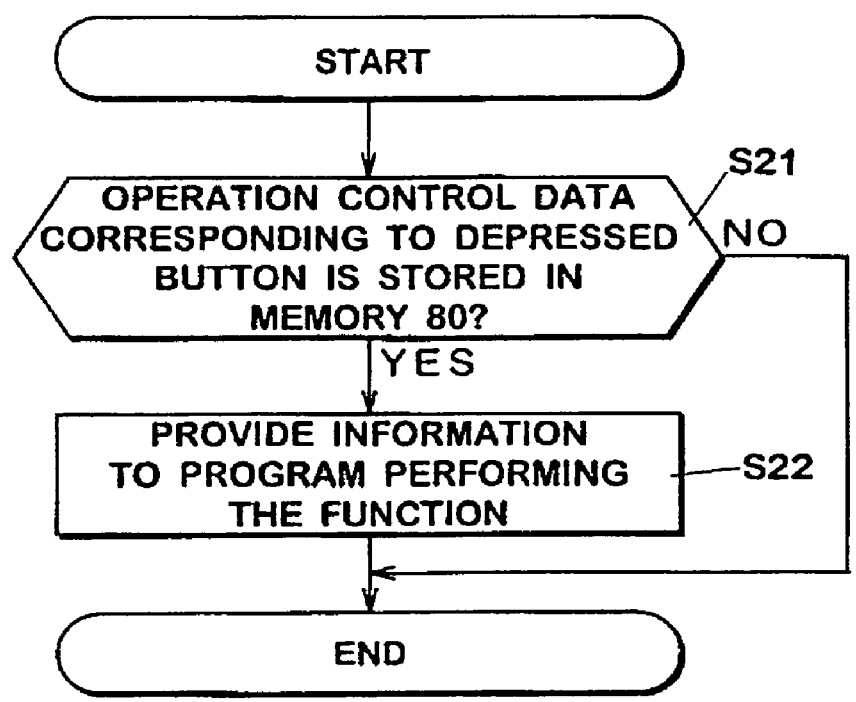
FIG. 12 is a flowchart showing the processing performed responsive to pushing a button.

Subsequently, processing performed when any of the buttons is depressed under the condition shown in FIG. 15 will be described. FIG. 12 shows a flowchart showing the processing performed responsive to pushing a button. In this embodiment, the program responsive to pushing a button is treated as part of the electronic mail processing program. This program may be independent from the mail-processing program.

The CPU 78 determines whether operation control data corresponding to the depressed button is stored in the memory 80 or not (step S 21 of FIG. 12). The description is continued under an assumption that the user depresses a blue-button 120 on the remote controller 88 (see FIG. 10). This means that operation control data corresponding to the blue-button 120 is stored as shown in FIG. 14. The CPU 78 reads out the control data and commands to the program, which perform appropriate processing to the stored function. A command is given to the program for making a reservation of recording since the description "record_reserve" is stored. The description indicating the functions and the programs performing such functions are associated with one another by preparing a table or similar way.

The CPU 78 also provides data for specifying a broadcasting program and data representing opening time of the program and duration thereof while providing a command for reservation to the program for making a reservation of recording (step S22 of FIG. 12). As shown in FIG. 17, data for making a reservation of a program is stored in the non-volatile memory 86 according to the program for making a reservation of recording. This step finalizes the processing performed responsive to pushing a button.

Figure 18:
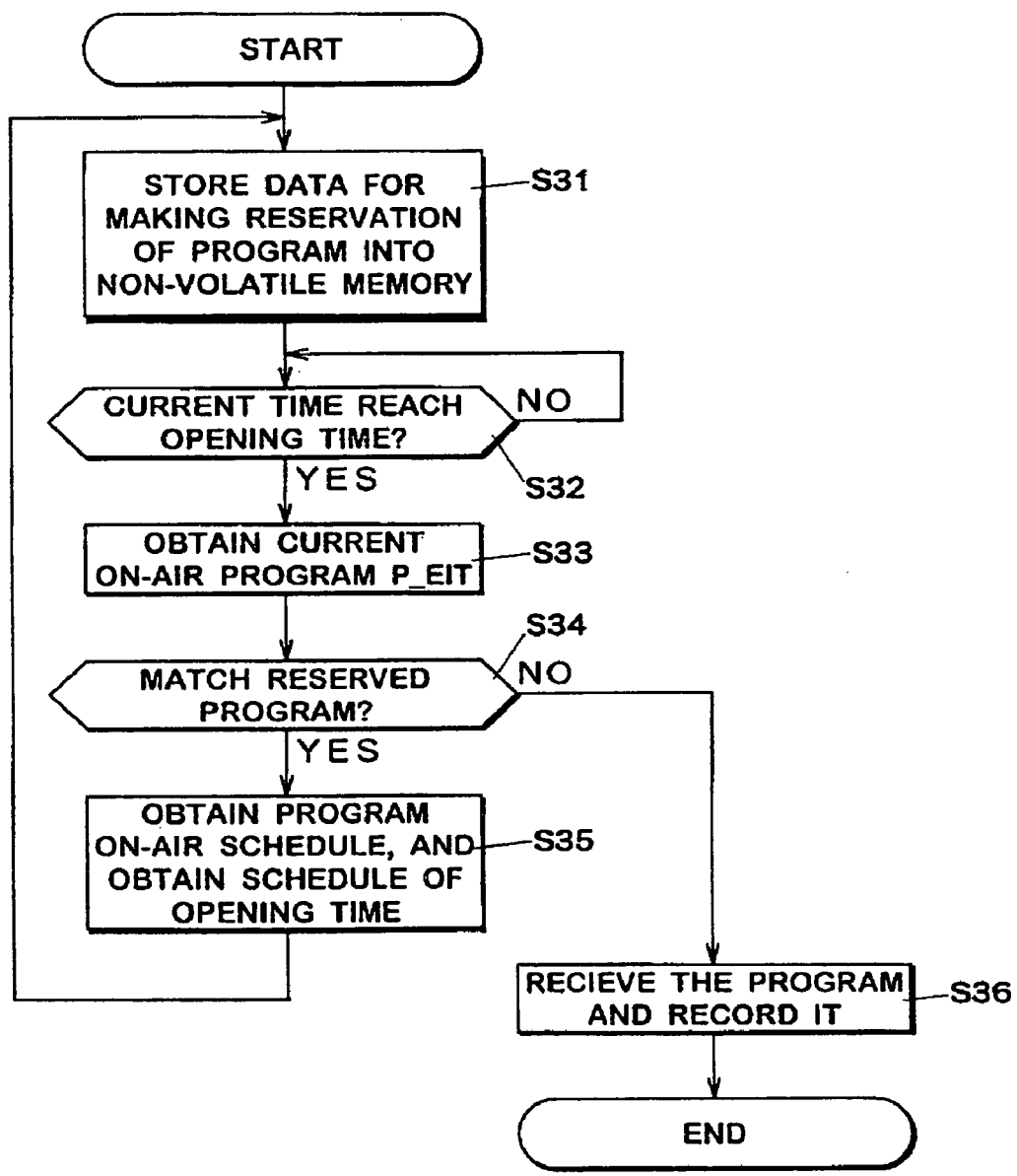
FIG. 18 is a flowchart showing steps performed in a program for making a reservation for recording.

FIG. 18 shows a flowchart of a program for making a reservation for recording. As described above, the data for making a reservation of a program is stored in the non-volatile memory 86 according to the command from the program for making a reservation of recording (step S31 of FIG. 18). Subsequently, the current time is retrieved through a watch installed in the STB 6 and a judgement is made that it reaches the predetermined opening time (step S32 of FIG. 18).

If it reaches the opening time, the CPU 78 controls the tuner 50 and TS decoder 72 to retrieve current on-air program data P_EIT (see FIG. 4) of the service "0003". In the current on-air program data P_EIT, information on programs currently on-air in the service is described.

The CPU 78 determines whether the current on-air program data P_EIT matches the reserved program or not (step S34 of FIG. 18). There is a case that both are not match if schedule of a program shift backwards due to extension of the previous program such as live-baseball game. In that case, the CPU obtains program on-air schedule data S_EIT as well as a revised schedule of an opening time of the desired program (step S35 of FIG. 18). In addition, data for making a reservation of recording stored in the non-volatile memory is revised to the newly retrieved opening time (step S31 of FIG. 18), and the CPU waits for the opening time (step S32 of FIG. 18).

If the current on-air program data P_EIT matches the reserved program, the reserved program is received and stored in the hard disk 76. In this embodiment, such program is stored in the hard disk, the program may be stored in other data storage medium, for example magnetic tape, DVD disk. The recording is ended when it reaches the finish time.

Description as to make a reservation for recording has been made, this can be applied to make a reservation for viewing a program.

In other words, the reservation can be made by just depressing a button assigned to make a reservation for recording a recommended program which is informed by an electronic mail ⑤ Other Embodiments In the above embodiments, an electronic mail is retrieved by accessing to the mail server 10 under the control of the user. Alternatively, the system can also be designed to automatically access to the mail server 10 at an interval of a certain period of time.

Also, connecting the line to the mail server 10 in the above embodiment checks existence of electronic mails in the in-box. Alternatively, the connection to the mail server 10 may be made only when a notice of receiving an electronic mail is received. In this way, waste of Internet access fees and time for connection, for example can be avoided.

Further, the connection to the mail server 10 may be made only when broadcasting signals makes a notice of sending an electronic mail via broadcasting signals.

In the above, embodiment, the mail server 10 is provided separate from the broadcasting device 2. The mail server 10 may be a part of the broadcasting device 2.

The assignment of functions to buttons provided on the remote controller is performed under the control of operation control signals in the above embodiments. The assignment of functions may also be made to buttons provided on the receiving device 6. This may also be made to icons displayed on the display screen.

In the above-described embodiment, the assignment of functions to buttons provided on the remote controller is performed under the control of operation control signals. Other operations, for example display of images, can be done with operation control signals as will be described below.

In the assignment described above, a function of making a reservation for recording one program is assigned to a button. Alternatively, a function of making a reservation for recording a plurality of programs may be assigned to a button.

The reservation can be suspended even if a button for making a reservation is depressed when an electronic mail previously used displayed on a display image for electronic mail shown in FIG. 15 is selected. In other words, the system may be designed so that not to make a reservation if the current time passes a scheduled on-air time.

3. The Second Embodiment (1) Operation Control Data is a Program

Figure 19:
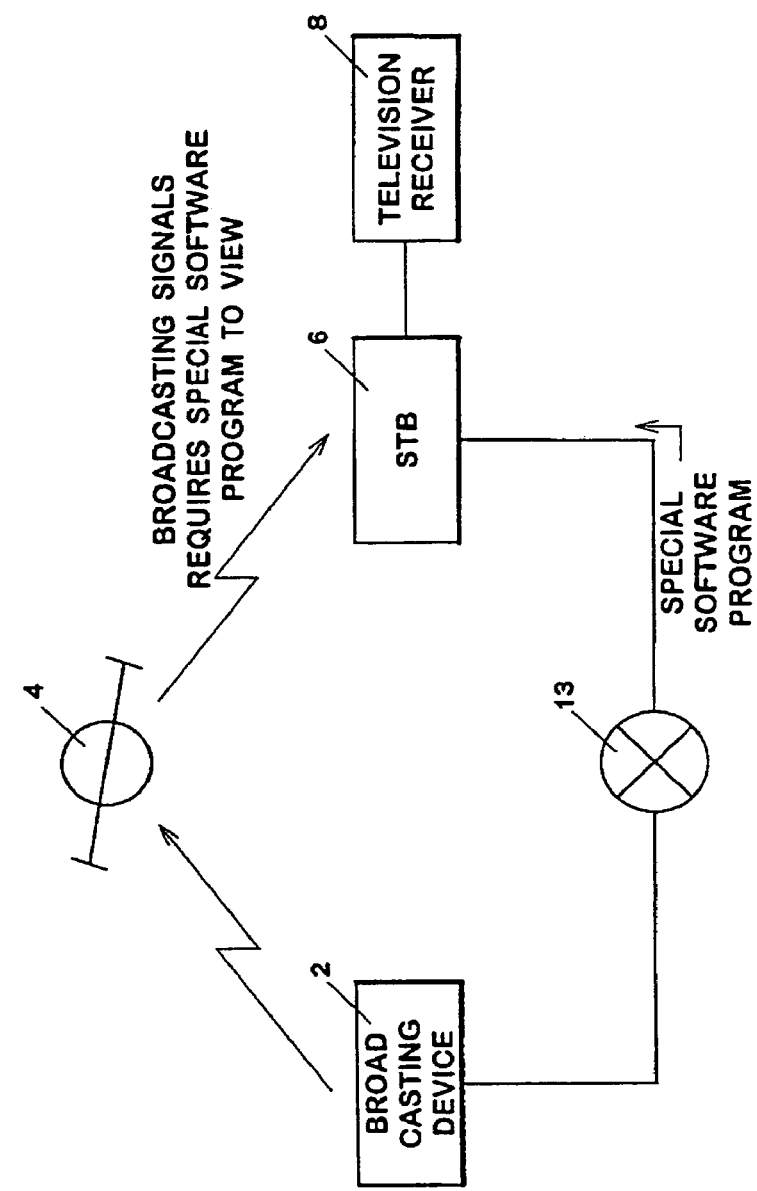
FIG. 19 is an overall view of a second embodiment of the present invention.

FIG. 19 is an overall view of the second embodiment of the present invention. A broadcasting device 6 and a STB 6 are connected through a public telephone network 13. This embodiment differs from the first embodiment in that operation control data are not transmitted in a form of an electronic mail, the data are transmitted through the public telephone network 13. In this way, the system according to this embodiment is suitable for the operation control data need to be used parallel to the broadcasting at the receiving device.

Figure 20:
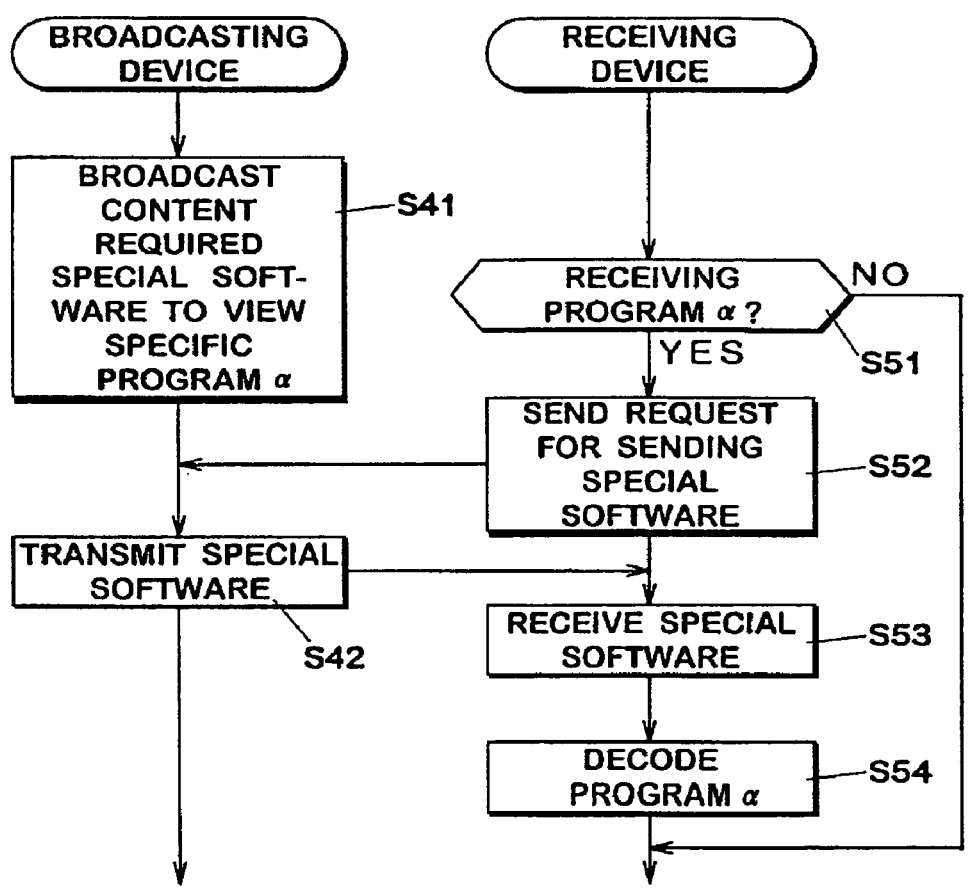
FIG. 20 is a flowchart showing steps performed at each device in the second embodiment.

For example, the broadcasting device 2 broadcasts a content, which requires a special software program to view the content in a specific even (program) of a specific service (step S41 of FIG. 20). The STB 6 determined whether the broadcasting is received or not. The STB 6 can recognize that a program requiring the special software program is being received since a notification of requiring such special program is described in the broadcasting signals.

The STB 6 sends a request for sending the special software program to the broadcasting device 2 when the STB 6 receives the broadcasting (step S52 of FIG. 20). Upon receiving such request, the broadcasting device 2 transmits the special software program to the STB 6 through the telephone network. The STB decodes the broadcasting signals using the special software program and outputs the decided signals.

(2) Operation Control Data is a Ticket for Viewing a Program

Figure 21:
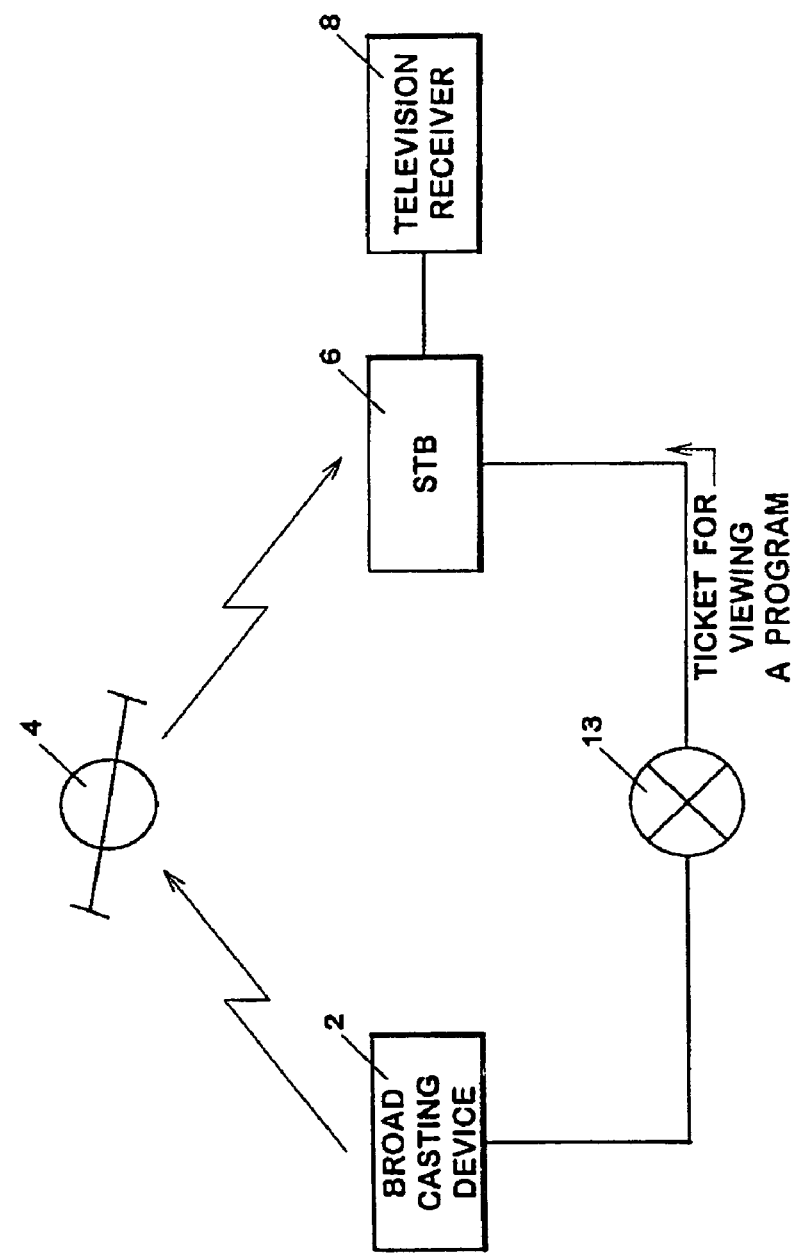
FIG. 21 is another overall view of the second embodiment when the system is applied to handle a ticket for allowing view of a program.
Figure 22:
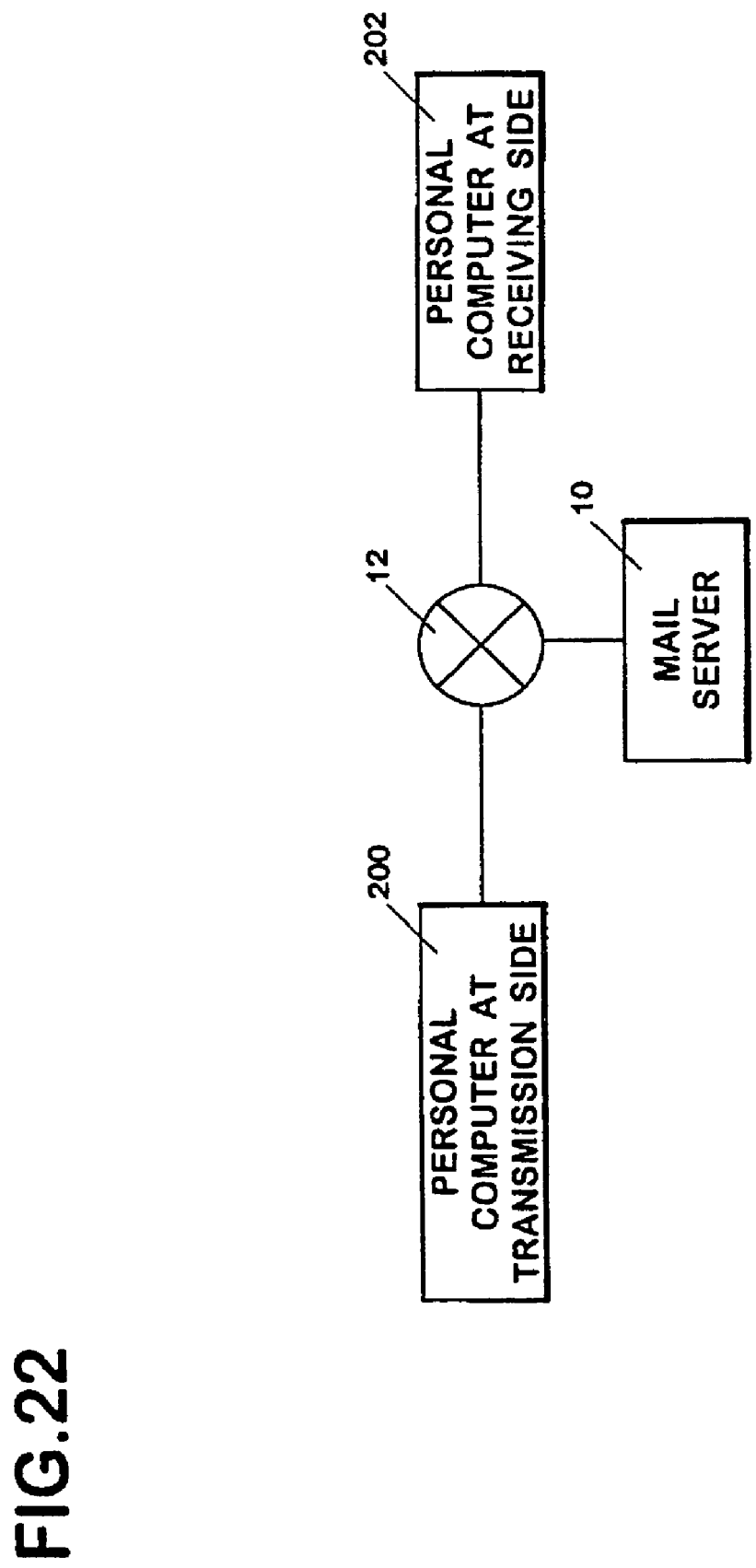
FIG. 22 is an overall view of a third embodiment of the present invention.

As shown in FIG. 21, a ticket for viewing a specific service and/or event (program) may also be transmitted from the broadcasting device 2 through the telephone network 13. The system is designed so that the STB 6 can not view the specific service and/or event (program) without the ticket. In this way, the broadcasting station can provide broadcasting program to just a predetermined user(s) appointed themselves.

Such method may be applied to provide a quiz program. In a quiz program, an answer to a given question is transmitted through the telephone network 13. The broadcasting device 2 provides a ticket for viewing subsequent question to the STB 6 through the telephone network 13 if the answer to the question is correct one. In this way, the system can be designed that no further question can not be viewed if the user provides the wrong answer.

(3) Other Embodiments

In the above-described embodiments, a software program and/or a ticket for viewing a specific service and/or event is transmitted as operation control data. Alternatively, data for assigning functions to buttons may be transmitted as operation control data similar to the first embodiment. Further, the data, which control a format of images may be transmitted as operation control data as will be described below.

4. The Third Embodiment (1) Control a Format of Images

In this embodiment, a system using PCs for the transmission side and the receiving side is exemplified. In other words, this embodiment is based on the assumption that a personal computer 200 at the transmission side transmits an electronic mail to a personal computer 202 at receiving side through a mail-server 10.

Figure 23:
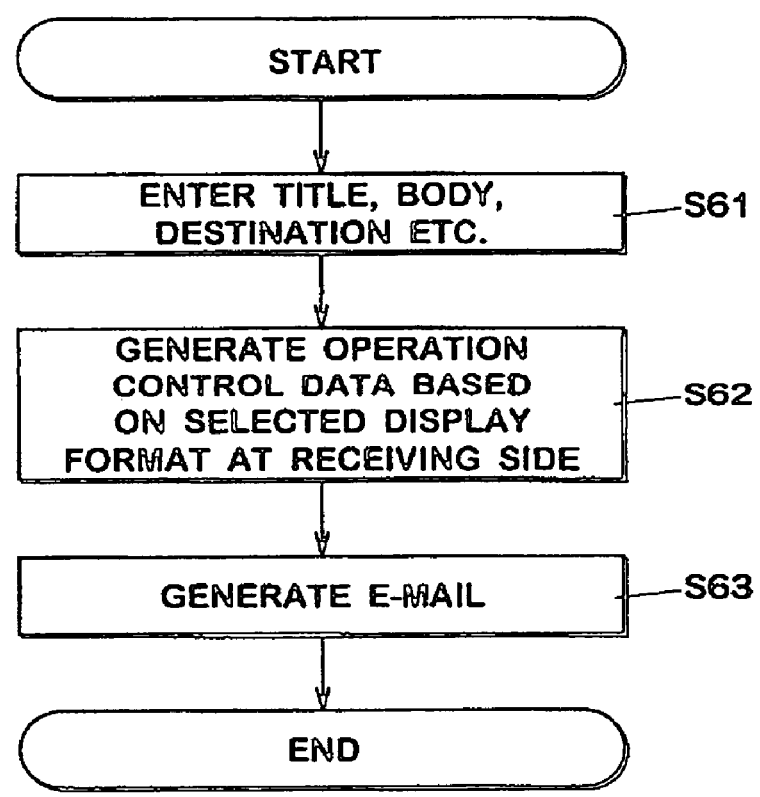
FIG. 23 is a flowchart showing steps performed for generating an electronic mail.

The personal computer 202 at receiving side generates an electronic mail including operation control data according to the process shown in FIG. 23. In order to generate an electronic mail, a user of the personal computer 200 at the transmission side enters the title, the body and the destination of the electronic mail (step S61 of FIG. 23). Upon entering the information, the personal computer 200 displays a plurality of display formats of the body of the electronic mail. The display formats includes "no linefeed format", "full-screen" for example.

The user of the personal computer 200 selects a desired display format from the display formats on the screen. Then the personal computer 200 generates operation control display based on the selection (step S62 of FIG. 23). As a result of performing these processes, an electric mail is generated (step S63 of FIG. 23).

Figure 24:
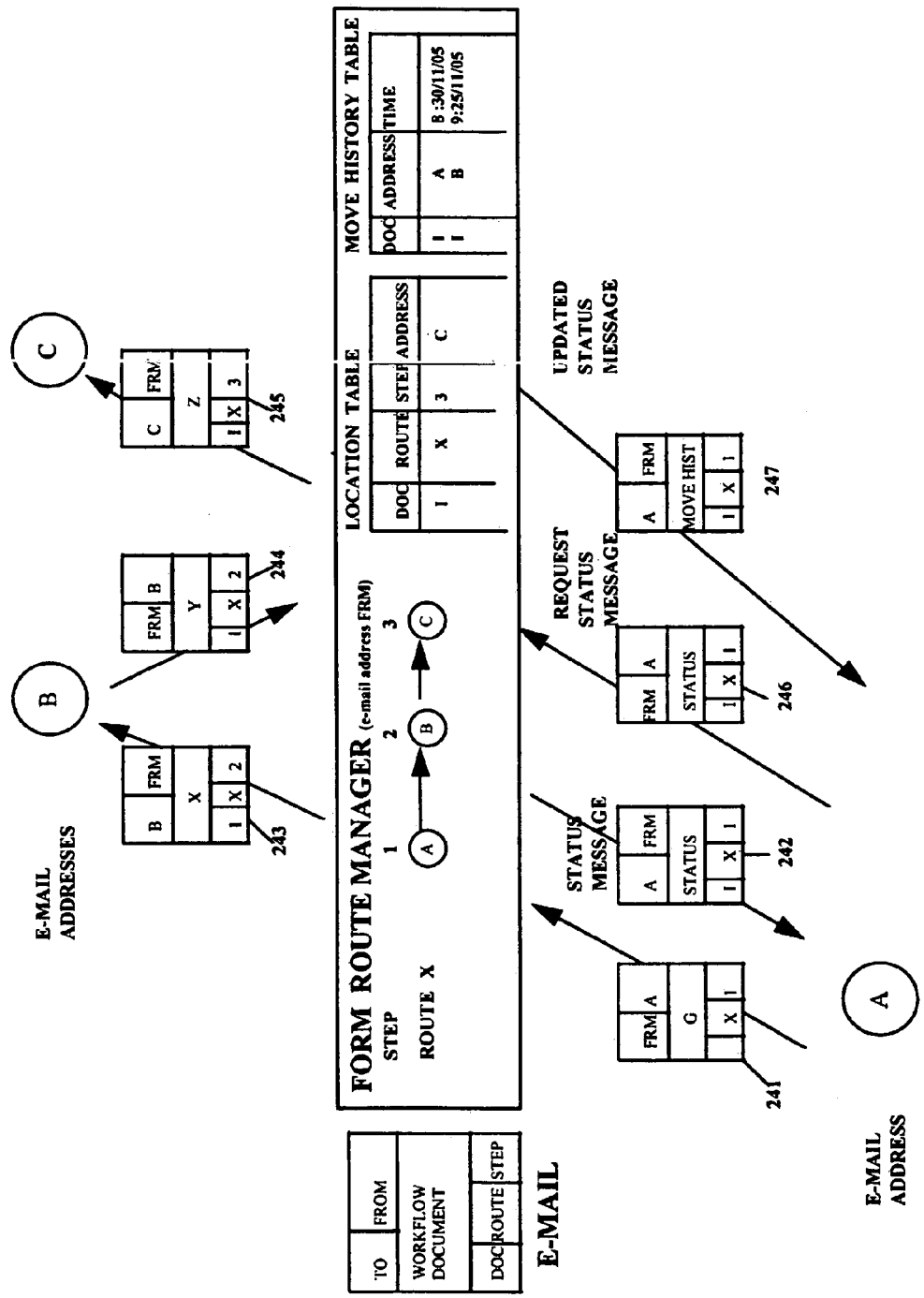
FIG. 24 is a view showing actual data on an electric mail.

Operation control data 300 shown in FIG. 24 is described if a display format "no linefeed format" is selected.

The personal computer 202, which receives such an electronic mail interprets the operation control data "X-nore-turn" and displays the electronic mail with no linefeed except for a region set at the transmitting personal computer regardless of characters per line for line feed set at the receiving personal computer. In this way, an electronic mail can be displayed in a form intended by the transmission side.

(2) Other Embodiments

In the above embodiments, display format is controlled by the operation control data. Alternatively, assigning functions to buttons may be designated by the operation control data similar to the first embodiment.

Figure 25:
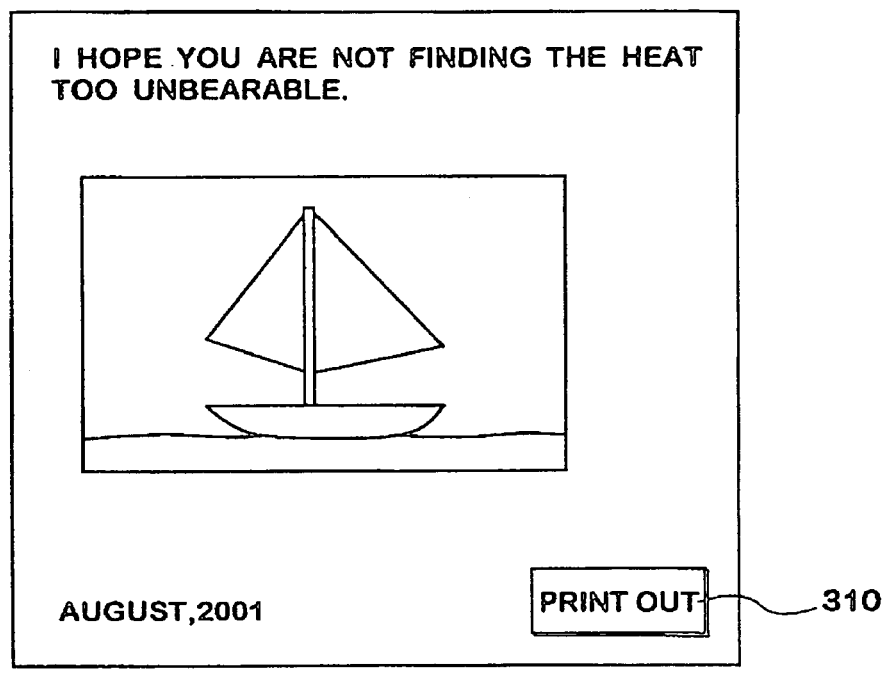
FIG. 25 is an image displayed according to the data on the electric-mail.

Further, as illustrated a received image shown in FIG. 25, an icon 310 may be displayed in the electronic mail using the operation control data. The operations performed after clicking the icon 310 can also be defined by the operation control data. In this way, appropriate processing agree with the body of the mail (intended by the transmission side) can be carried out. As a consequence, the transmission side can designate whether a printed paper has trimming or not.

5. Other Embodiments

In all the embodiments described in the above, the device itself which receives operation control data is controlled. Alternatively, other device(s) may be controlled by the operation control data. For example, if a broadcasting 2 broadcasts a ghost story while transmitting operation control data to a receiving device 6 through a communications line. The receiving device 6 may be designed so that the device receives the ghost story while controlling luminance of the lights under the control of the operation control data received through the communications line. This can achieve a broadcast with realistic feelings.

Further, all the embodiments described in the above, the Internet communications network, a public telephone network are used as the communications path. A part of the broadcasting path used under time-sharing or under frequency-division may be used as the communications path.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. A transmission device for transmitting an electronic mail to a receiving device, wherein the transmission device transmits electric mail data, the data comprising:
   a body region describing content of the electronic mail; and
   an auxiliary region describing data necessary for transmitting the electronic mail;
   wherein operation control data for controlling an operation mode of the receiving device is included into the auxiliary region, and
   said operation control data comprises instruction for format of image of a button of the receiving device and/or instruction for operation when the button is pushed.

2. A transmission device for transmitting an electronic mail to a receiving device, wherein the transmission device transmits electric mail data, the data comprising:
   a body region describing content of the electronic mail; and
   an auxiliary region describing data necessary for transmitting the electronic mail;
   wherein operation control data for controlling an operation mode of the receiving device is included into the auxiliary region, and
   said received operation data instructs the receiving device to change the control assigned to each operation button.

3. A transmission device for transmitting an electronic mail to a receiving device, wherein the transmission device transmits electric mail data, the data comprising:
   a body region describing content of the electronic mail; and
   an auxiliary region describing data necessary for transmitting the electronic mail;
   wherein operation control data for controlling an operation mode of the receiving device is included into the auxiliary region,
   the operation control data includes a description for making a reservation for recording a program to be transmitted via the broadcasting path and another description for assigning a function of making a reservation for recording the program to which of the operation button, and
   wherein the receiving device assigns the function of making a reservation for recording the program to one of the operation buttons in accordance with the description of the operation control data.

4. A receiving device for receiving an electronic mail, wherein the receiving device outputs a body of the received electronic mail to a user and constructs a user interface for performing a control related with the body of the electronic mail in accordance with operation mode data transmitted with the body of the electronic mail, the data comprising:
   a body region describing content of the electronic mail; and
   an auxiliary region describing data necessary for transmitting the electronic mail;
   wherein operation control data for controlling an operation mode of the receiving device is included into the auxiliary region, and
   said operation control data comprises instruction for format of image of a button of the receiving device and/or instruction for operation when the button is pushed.

5. A receiving device for receiving an electronic mail, wherein the receiving device outputs a body of the received electronic mail to a user and constructs a user interface for performing a control related with the body of the electronic mail in accordance with operation mode data transmitted with the body of the electronic mail, the data comprising:
a body region describing content of the electronic mail; and
an auxiliary region describing data necessary for transmitting the electronic mail;
wherein operation control data for controlling an operation mode of the receiving device is included into the auxiliary region, and
said received operation data instructs the receiving device to change the control assigned to each operation button.

6. A receiving device for receiving an electronic mail, wherein the receiving device outputs a body of the received electronic mail to a user and constructs a user interface for performing a control related with the body of the electronic mail in accordance with operation mode data transmitted with the body of the electronic mail, the data comprising:
a body region describing content of the electronic mail; and
an auxiliary region describing data necessary for transmitting the electronic mail;
wherein operation control data for controlling an operation mode of the receiving device is included into the auxiliary region,
the operation control data includes a description for making a reservation for recording a program to be transmitted via the broadcasting path and another description for assigning a function of making a reservation for recording the program to which of the operation button, and
wherein the receiving device assigns the function of making a reservation for recording the program to one of the operation buttons in accordance with the description of the operation control data.

7. A communication method for transmitting an electronic mail from a transmission device to a receiving device, the method comprising the steps of:
preparing the electronic mail data, and
transmitting the electronic mail data prepared by the preparing step,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region, and
said operation control data comprises instruction for format of image of a button of the receiving device and/or instruction for operation when the button is pushed.

8. A communication method for transmitting an electronic mail from a transmission device to a receiving device, the method comprising the steps of:
preparing the electronic mail data, and
transmitting the electronic mail data prepared by the preparing step,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region, and
said received operation data instructs the receiving device to change the control assigned to each operation button.

9. A communication method for transmitting an electronic mail from a transmission device to a receiving device, the method comprising the steps of:
preparing the electronic mail data, and
transmitting the electronic mail data prepared by the preparing step,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region,
the operation control data includes a description for making a reservation for recording a program to be transmitted via the broadcasting path and another description for assigning a function of making a reservation for recording the program to which of the operation button, and
wherein the receiving device assigns the function of making a reservation for recording the program to one of the operation buttons in accordance with the description of the operation control data.

10. A communication method for receiving an electronic mail from a transmission device to a receiving device, the method comprising the steps of:
receiving the electronic mail data, and
constructing a user interface for performing a control in accordance with the electronic mail data,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region, and
said operation control data comprises instruction for format of image of a button of the receiving device and/or instruction for operation when the button is pushed.

11. A communication method for transmitting an electronic mail from a transmission device to a receiving device, the method comprising the steps of:
receiving the electronic mail data, and
constructing a user interface for performing a control in accordance with the electronic mail data,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region, and
said received operation data instructs the receiving device to change the control assigned to each operation button.

12. A communication method for transmitting an electronic mail from a transmission device to a receiving device, the method comprising the steps of:

preparing the electronic mail data, and
transmitting the electronic mail data prepared by the preparing step,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region,
the operation control data includes a description for making a reservation for recording a program to be transmitted via the broadcasting path and another description for assigning a function of making a reservation for recording the program to which of the operation button, and
wherein the receiving device assigns the function of making a reservation for recording the program to one of the operation buttons in accordance with the description of the operation control data.

13. A computer-readable storage medium for storing a program realizing a transmission device, for transmitting an electronic mail to a receiving device, using a computer, the program comprising the step of:
transmitting operation control data, for controlling a user interface of the receiving device when a control related with a body of the electronic mail is performed at the receiving device, together with the body of the electronic mail so as to be included in the body,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region, and
said operation control data comprises instruction for format of image of a button of the receiving device and/or instruction for operation when the button is pushed.

14. A computer-readable storage medium for storing a program realizing a transmission device, for transmitting an electronic mail to a receiving device, using a computer, the program comprising the step of:
transmitting operation control data, for controlling a user interface of the receiving device when a control related with a body of the electronic mail is performed at the receiving device, together with the body of the electronic mail so as to be included in the body,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region, and
said received operation data instructs the receiving device to change the control assigned to each operation button.

15. A computer-readable storage medium for storing a program realizing a transmission device, for transmitting an electronic mail to a receiving device, using a computer, the program comprising the step of:
transmitting operation control data, for controlling a user interface of the receiving device when a control related with a body of the electronic mail is performed at the receiving device, together with the body of the electronic mail so as to be included in the body,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region,
the operation control data includes a description for making a reservation for recording a program to be transmitted via the broadcasting path and another description for assigning a function of making a reservation for recording the program to which of the operation button, and
wherein the receiving device assigns the function of making a reservation for recording the program to one of the operation buttons in accordance with the description of the operation control data.

16. A computer-readable storage medium for storing a program realizing a receiving device for receiving an electronic mail, using a computer, the program comprising the steps of:
outputting a body of the received electronic mail to a user; and
constructing a user interface for performing a control related with the body of the electronic mail in accordance with operation control data transmitted with the body of the electronic mail,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region, and
said operation control data comprises instruction for format of image of a button of the receiving device and/or instruction for operation when the button is pushed.

17. A computer-readable storage medium for storing a program realizing a receiving device for receiving an electronic mail, using a computer, the program comprising the steps of:
outputting a body of the received electronic mail to a user; and
constructing a user interface for performing a control related with the body of the electronic mail in accordance with operation control data transmitted with the body of the electronic mail,
wherein said e-mail data comprising:
a body region describing content of the electronic mail; and
an auxiliary region describing data necessary for transmitting the electronic mail;
wherein operation control data for controlling an operation mode of the receiving device is included into the auxiliary region, and
said received operation data instructs the receiving device to change the control assigned to each operation button.

18. A computer-readable storage medium for storing a program realizing a receiving device for receiving an electronic mail, using a computer, the program comprising the steps of:
outputting a body of the received electronic mail to a user; and constructing a user interface for performing a control related with the body of the electronic mail in accordance with operation control data transmitted with the body of the electronic mail, wherein said e-mail data comprising:

a body region describing content of the electronic mail; and an auxiliary region describing data necessary for transmitting the electronic mail;

wherein operation control data for controlling an operation mode of the receiving device is included into the auxiliary region, the operation control data includes a description for making a reservation for recording a program to be transmitted via the broadcasting path and another description for assigning a function of making a reservation for recording the program to which of the operation button, and wherein the receiving device assigns the function of making a reservation for recording the program to one of the operation buttons in accordance with the description of the operation control data.

* * * * *